United States Patent
Sato et al.

(10) Patent No.: US 10,093,789 B2
(45) Date of Patent: *Oct. 9, 2018

(54) POLYIMIDE RESIN COMPOSITION, AND (POLYIMIDE RESIN)-FIBER COMPOSITE MATERIAL

(71) Applicant: MITSUBISHI GAS CHEMICAL COMPANY, INC., Chiyoda-ku (JP)

(72) Inventors: Yuuki Sato, Kanagawa (JP); Jun Mitadera, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 312 days.

This patent is subject to a terminal disclaimer.

(21) Appl. No.: 14/909,335

(22) PCT Filed: Aug. 4, 2014

(86) PCT No.: PCT/JP2014/070533
§ 371 (c)(1),
(2) Date: Feb. 1, 2016

(87) PCT Pub. No.: WO2015/020020
PCT Pub. Date: Feb. 12, 2015

(65) Prior Publication Data
US 2016/0177062 A1 Jun. 23, 2016

(30) Foreign Application Priority Data

Aug. 6, 2013 (JP) .................................. 2013-163310
Aug. 6, 2013 (JP) .................................. 2013-163319

(Continued)

(51) Int. Cl.
*C08K 7/14* (2006.01)
*C08K 3/24* (2006.01)
(Continued)

(52) U.S. Cl.
CPC ............... *C08K 7/14* (2013.01); *C08G 73/105* (2013.01); *C08G 73/1042* (2013.01);
(Continued)

(58) Field of Classification Search
CPC ................. C08G 73/10; C08G 73/1042; C08G 73/1046; C08G 73/1075; C08G 73/078; C08G 73/1082; C08G 73/1085; Y10T 428/31681; Y10T 428/31721

See application file for complete search history.

(56) References Cited

U.S. PATENT DOCUMENTS 3,608,054 A * 9/1971 Alvino ..................... B05D 5/08
264/309
2005/0272907 A1 12/2005 Jin et al.
2012/0021234 A1 * 1/2012 Fukukawa ............... B32B 15/08
428/458
2014/0200325 A1 7/2014 Sato et al.

FOREIGN PATENT DOCUMENTS

CN 1639262 A 7/2005
CN 101580637 A 11/2009
(Continued)

OTHER PUBLICATIONS

Pritchard, et al. "Traditional Fillers for Plastics" Section 5.1, p. 13, Jan. 1, 1999. (Year: 1999).*

(Continued)

*Primary Examiner* — Christopher M Rodd
(74) *Attorney, Agent, or Firm* — Oblon, McClelland, Maier & Neustadt, L.L.P.

(57) ABSTRACT

[1] A polyimide resin composition containing a polyimide resin (A) and an additive (B), the polyimide resin (A) containing a repeating structural unit represented by the following formula (1) and a repeating structural unit represented by the following formula (2), a content ratio of the repeating structural unit of formula (1) with respect to the total of the repeating structural unit of formula (1) and the repeating structural unit of formula (2) being from 40 to 70 mol %; and [2] a composite material containing a fiber material (C) impregnated with a polyimide resin (A) containing a repeating structural unit represented by the following formula (1) and a repeating structural unit represented by the following formula (2), a content ratio of the repeating structural unit of formula (1) with respect to the total of the repeating structural unit of formula (1) and the repeating structural unit of formula (2) being from 40 to 70 mol %:

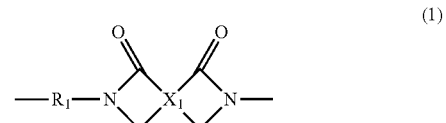

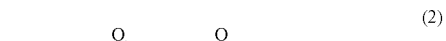

wherein $R_1$ represents a divalent group having from 6 to 22 carbon atoms containing at least one alicyclic hydrocarbon structure; $R_2$ represents a divalent chain aliphatic group having from 5 to 20 carbon atoms; and $X_1$ and $X_2$ each independently represent a tetravalent group having from 6 to 22 carbon atoms containing at least one aromatic ring.

24 Claims, 1 Drawing Sheet

(30) Foreign Application Priority Data

| Aug. 6, 2013 | (JP) | 2013-163321 |
|---|---|---|
| Aug. 6, 2013 | (JP) | 2013-163323 |
| Aug. 6, 2013 | (JP) | 2013-163324 |
| Aug. 6, 2013 | (JP) | 2013-163325 |
| Aug. 6, 2013 | (JP) | 2013-163329 |

(51) Int. Cl.

| C08K 5/521 | (2006.01) |
|---|---|
| C08J 5/18 | (2006.01) |
| C08K 3/22 | (2006.01) |
| C08K 3/04 | (2006.01) |
| C08K 5/10 | (2006.01) |
| C08K 5/20 | (2006.01) |
| C08K 3/34 | (2006.01) |
| C08K 5/18 | (2006.01) |
| C09J 179/08 | (2006.01) |
| C08L 79/08 | (2006.01) |
| D01F 6/74 | (2006.01) |
| C08G 73/10 | (2006.01) |
| C08K 5/00 | (2006.01) |

(52) U.S. Cl.

CPC ............ *C08G 73/1082* (2013.01); *C08J 5/18* (2013.01); *C08K 3/04* (2013.01); *C08K 3/22* (2013.01); *C08K 3/24* (2013.01); *C08K 3/34* (2013.01); *C08K 5/0008* (2013.01); *C08K 5/10* (2013.01); *C08K 5/18* (2013.01); *C08K 5/20* (2013.01); *C08K 5/521* (2013.01); *C08L 79/08* (2013.01); *C09J 179/08* (2013.01); *D01F 6/74* (2013.01); *C08J 2379/08* (2013.01); *C08K 2003/2241* (2013.01)

(56) References Cited

FOREIGN PATENT DOCUMENTS

| CN | 101634778 A | 1/2010 |
|---|---|---|
| CN | 102369233 A | 3/2012 |
| EP | 2 738 199 A1 | 6/2014 |
| JP | 07-173300 A | 7/1995 |
| JP | 2002179913 A | * 6/2002 |
| JP | 2002-206057 A | 7/2002 |
| JP | 2004-083814 A | 3/2004 |
| JP | 2005-028524 A | 2/2005 |
| JP | 2005-249952 A | 9/2005 |
| JP | 2005-320424 A | 11/2005 |
| JP | 2006-336009 | 12/2006 |
| JP | 2009-114439 A | 5/2009 |
| JP | 2009-216919 | 9/2009 |
| JP | 2011-246726 A | 12/2011 |
| JP | 2013-010255 A | 1/2013 |
| JP | 5365762 B1 | 12/2013 |
| WO | WO 2013/118704 A1 | 8/2013 |

OTHER PUBLICATIONS

FTL-300 product webpage, Feb. 2, 2018. (Year: 2018).*
JP2002179913 English Machine Translation, Feb. 2, 2018 (Year: 2018).*
Stephen Z.D. Cheng, et al., "Crystal Structure, Crystallization Kinetics and Morphology of a New Polyimide" Polymer International, vol. 29, No. 3, XP055347094, 1992, pp. 201-208.
"Aurum Technical Information/G-O6 AURUM injection molding conditions", Mitsui Chemicals, Inc., Jan. 15, 2004, http://jp.mitsuichem.com/info/aurum/aurum#pdf/G#06.pdf, 1 page.
Yudin, Vladimir E., et al., "The Nucleating Effect of Carbon Nanotubes on Crystallinity in R-BAPB-Type Thermoplastic Polyimide", Macromolecular Rapid Communications, Feb. 7, 2005, pp. 885-888.
"Revised Edition, Latest Polyimides—Basics and Applications ", ed. By Polyimide & Aromatic Polymers Research Group, NTS, Aug. 2010, 2 pages.
International Search Report dated Sep. 9, 2014 for PCT/JP2014/070533 filed on Aug. 4, 2014.

* cited by examiner

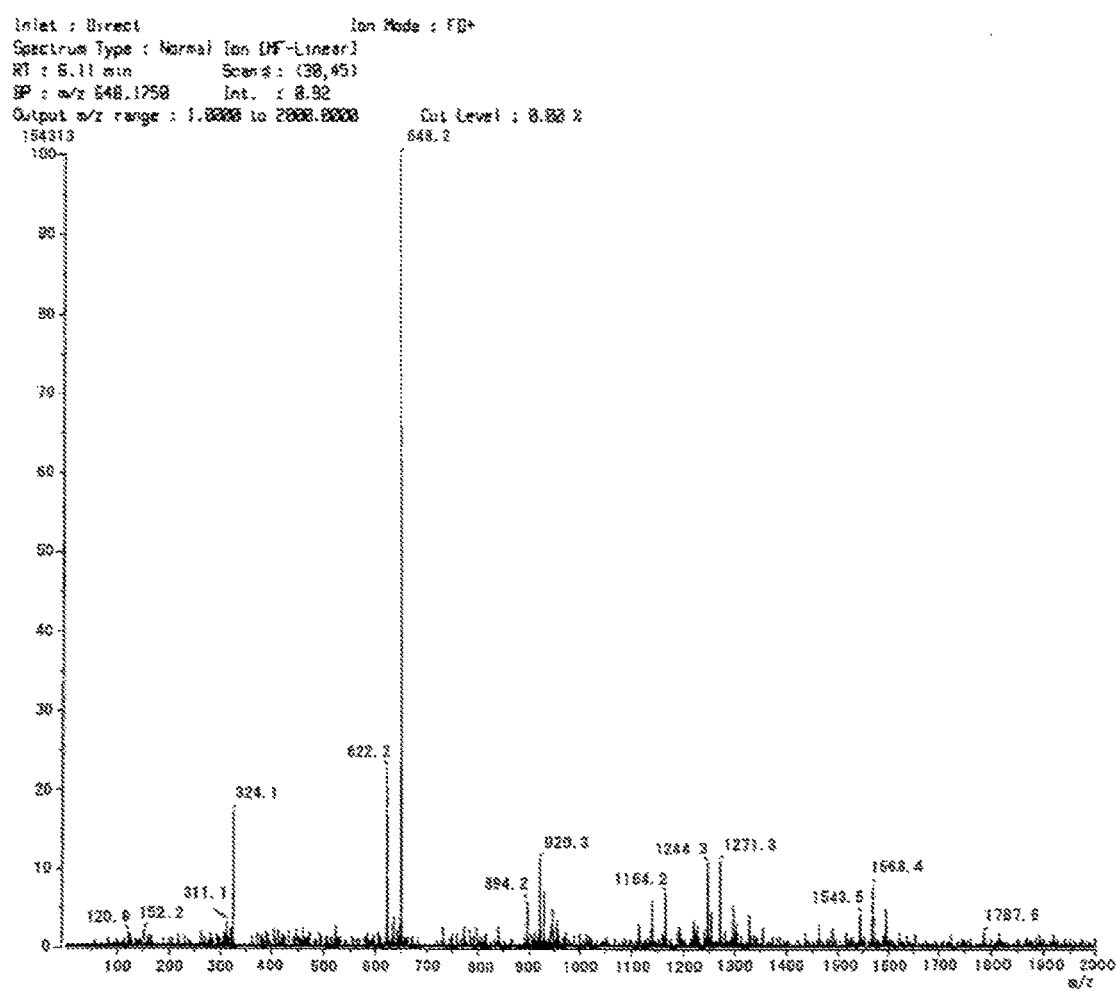

POLYIMIDE RESIN COMPOSITION, AND (POLYIMIDE RESIN)-FIBER COMPOSITE MATERIAL

TECHNICAL FIELD

The present invention relates to a polyimide resin composition and a polyimide resin-fiber composite material.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. However, such a polyimide resin has high heat resistance, but on the other hand, disadvantageously exhibits no thermoplasticity and has low molding processability.

For example, Vespel (registered trademark), a highly heat-resistant resin, is known as a polyimide molding material (PTL 1). This resin is difficult to process by molding clue to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

For example, Aurum (registered trademark) is known as a thermoplastic polyimide resin (NPL 1). However, Aurum is limited by an available apparatus because this resin has a high melting point and requires a molding temperature of generally 400° C. or more.

A method using a long linear aliphatic diamine as a raw material diamine is one of the methods for improving the molding processability of the polyimide resin, i.e., the methods for decreasing the melting point of the polyimide resin (NPL 2). This reduces the rigidity of the polyimide resin, and thus also decreases the melting point. This method, however, might decrease the glass transition temperature along with the decrease of the melting point, and in particular, might reduce the strength at a high temperature. Another problem of this method is difficult synthesis of a polyimide resin using a raw material diamine composed mainly of an aliphatic diamine.

For the thermoplastic polyimide resin, it is desirable to impart various kinds of capabilities, for example, excellent mechanical strength, flame resistance, design properties, slidability, heat aging resistance, and conductivity, according to its use application.

As for imparting of mechanical strength, the thermoplastic polyimide resin may be reinforced with various kinds of fillers, such as glass fiber or carbon fiber. Among compound resins, a material containing a highly heat-resistant resin reinforced with a filler, such as glass fiber or carbon fiber, is increasingly being adopted in a wide range of fields that require high strength, high heat resistance, and long-term heat resistance, such as electronic members for surface mounting, members for automobile or aircraft engine peripherals, and members for ducts. With recent progress in technology, there has been a growing demand for strength or heat resistance. Since various characteristics, such as strength or heat resistance, are remarkably improved by the addition of various kinds of fillers, the compound resins have a high market share. However, the addition of a filler to Aurum is presumed to further reduce flowability and reduce molding processability.

As for imparting of flame resistance, Aurum is a wholly aromatic polyimide, and thus exhibits high flame resistance at a V-0 level in the UL94 standards. However, the problem of Aurum, as mentioned above, is a high melting point and low molding processability. On the other hand, if a long linear aliphatic diamine is used as a raw material diamine for improving the molding processability of the polyimide resin, the aliphatic site of the polyimide resin reduces resistance to thermal decomposition. In this case, flame resistance as very high as that of wholly aromatic polyimide resins is not exerted (NPL 3).

As for imparting of design properties, a polyimide resin is generally colored brown. This is due to the occurrence of intermolecular or intramolecular charge transfer. The coloring of the polyimide resin may become problematic in fields that require an excellent hue or in fields that require design properties, such as medical equipment, food manufacturing equipment, and substrates for solar cells.

Such coloring may be improved with various kinds of colorants. The polyimide resin assumes brown color mixed with redness and yellowishness. It is considered that the brown color may be canceled with a colorant of blue or green color, which is a complementary color of these colors. It is also considered that the polyimide resin-derived coloring may be suppressed by the addition of approximately several tens of mass % of a white colorant.

However, a general polyimide resin exhibits no melting point below the decomposition temperature. For obtaining a polyimide resin in which a colorant is uniformly dispersed, it is required to add a colorant at the stage of a polyamic acid solution, which is a precursor thereof. In this case, the final molded product is limited to a film or sheet shape. For a soluble polyimide resin, it is also necessary to add a colorant in the state of a polyimide resin solution. Hence, the final molded product is similarly limited by its shape.

A thermoplastic polyimide resin is useful because a colorant may be added during heat melting while a molded article may be produced in various shapes. However, Aurum is limited by an available colorant because it has a high melting point and requires a molding temperature of generally 400° C. or more, as mentioned above.

As for imparting of slidability, a polyimide resin generally exhibits favorable high-temperature sliding characteristics and is capable of intending higher high-temperature sliding characteristics by the addition of a slidability-improving agent.

A slidable material containing a highly heat-resistant resin supplemented with a slidability-improving agent is processed into gears, bearings, bearings, bushes and the like, and in particular, is increasingly being used in a wide range of fields that require high heat resistance, such as transport planes. Thus, its usefulness is high.

As for imparting of heat aging resistance, Aurum mentioned above is a wholly aromatic polyimide, and such a wholly aromatic polyimide generally exhibits high heat aging resistance. However, the problem of Aurum, as mentioned above, is a high melting point and low molding processability. If a long linear aliphatic diamine is used as a raw material diamine for improving the molding processability of the polyimide resin, the aliphatic site of the polyimide resin serves as a starting point for thermal degradation. Hence, this polyimide is far inferior in heat aging resistance to wholly aromatic polyimides (NPL 3).

As for imparting of conductivity, a polyimide resin is excellent in heat resistance, mechanical strength and the like. Studies have been made on use of the polyimide resin in fixing belts or intermediate transfer belts for use in, for example, copiers, printers, laser printers, facsimiles and their complex apparatuses, by mixing with a conductive material, such as carbon black. However, a general polyimide resin that exhibits no thermoplasticity requires complicated synthesis and film formation steps, and thus disadvantageously tends to aggregate by the addition of carbon black (see e.g., PTL 4). Aurum mentioned above is a thermoplastic polyimide resin, and its problem is a high melting point and low molding processability.

A composite material containing a thermoplastic resin combined with a fiber material is also known.

A composite material containing a resin combined with a fiber material, such as glass fiber, carbon fiber, or aramid fiber, has a light weight and high rigidity. A molded article using the composite material is therefore being used widely in mechanical parts, electric or electronic instrumental parts, parts or members for vehicles, instrumental parts for aircrafts or space, and the like. A thermosetting resin, such as an unsaturated polyester resin or an epoxy resin, or a thermoplastic resin, such as a polyolefin resin or a polyimide resin, is generally used as the resin for the composite material. The composite material using the thermosetting resin is advantageously excellent in physical properties, such as mechanical strength, but is disadvantageously unable to be remolded once molded by heating. For these reasons, a composite material using a thermoplastic resin that is remoldable by heating any number of times (see PTL 2 and PTL 3) has received attention, but is expected for further improvement in physical properties, such as mechanical strength.

A polyimide resin is known to be excellent in mechanical strength. The polyimide resin is a useful engineering plastic that has excellent mechanical strength as well as excellent thermal stability and solvent resistance due to rigidity, resonance stabilization and firm chemical bond of the molecular chain. The polyimide resin, however, generally has no melting point at a temperature lower than the decomposition temperature and exhibits no thermoplasticity. Accordingly, the polyimide resin, compared with the thermoplastic resins mentioned above, is difficult to prepare into a composite with a fiber material. Even if a composite material can be produced, the composite material disadvantageously has low molding processability.

Among polyimide resins, there exists a polyimide resin that exhibits thermoplasticity. For example, Aurum (registered trademark) is known as such a polyimide resin (see NPL 1). The material is a rigid wholly aromatic polyimide but succeeds to have a melting point, which is generally difficult to be observed, at a temperature lower than the decomposition temperature by introducing plural flexible ether bonds and meta structures into the structure. The material has a large number of flexible structures but has a high melting point (388° C.), which is peculiar to a polyimide, and in particular, a higher temperature exceeding 400° C. is required for molding the material. It can be said that there are difficulties in restrictions on equipment and handling property.

For improving the moldability, there have been some attempts of decreasing a melting point of a polyimide, but in practice, decreasing the melting point also decreases the glass transition temperature, thereby extinguishing the high glass transition temperature, which is peculiar to a polyimide. There is an empirical rule that the melting point and the glass transition temperature have a certain relationship (in general, there is often an approximate relationship, (glass transition temperature)/(melting point)=⅔ in terms of absolute temperature), and therefore decreasing the melting point for improving the moldability generally also decreases the glass transition temperature, which is one of the basic factors of the heat resistance.

For example, a method using a long linear aliphatic diamine as a raw material diamine is one of the methods for decreasing the melting point of a polyimide resin (NPL 2). This reduces the rigidity of the polyimide resin, and thus also decreases the melting point. However, the glass transition temperature is largely decreased along with the decrease of the melting point according to the aforementioned general rule, thereby extinguishing the high glass transition temperature, which is peculiar to the polyimide. Another problem of this method is difficult synthesis of a polyimide resin using a raw material diamine composed mainly of an aliphatic diamine.

CITATION LIST

Patent Literature

PTL 1: JP-A-2005-28524
PTL 2: JP-A-7-173300
PTL 3: JP-A-2013-10255
PTL 4: JP-A-2005-249952

Non Patent Literature

NPL 1: "AURUM Technical Information/G-06 AURUM injection molding conditions", [online], Jan. 15, 2004 [searched on Jun. 28, 2013], Internet <URL: http://jp.mit-suichem.com/info/aurum/aurum#pdf/G#06.pdf>
NPL 2: Macromol. Rapid. Commun., 885, 26, 2005
NPL 3: "Revised Edition, Latest Polyimides—Basics and Applications—", ed. by Polyimide & Aromatic Polymers Research Group, NTS, published in August 2010, p. 175-176

SUMMARY OF INVENTION

Technical Problem

The first object of the present invention is to provide a polyimide resin composition that is capable of being easily processed by molding and prepared into a molded article having excellent heat resistance and a desired capability, for example, mechanical strength, flame resistance, design properties, slidability, heat aging resistance, and conductivity.

The second object of the present invention is to solve the problems as described above in the conventional techniques and to provide a novel polyimide resin-fiber composite material.

Solution to Problem

The present inventors have found that the first object can be attained by a polyimide resin composition containing a particular polyimide resin and an additive.

According to the first aspect, the present invention provides a polyimide resin composition containing a polyimide resin (A) and an additive (B), the polyimide resin (A) containing a repeating structural unit represented by the following formula (1) and a repeating structural unit represented by the following formula (2), a content ratio of the repeating structural unit of formula (1) with respect to the total of the repeating structural unit of formula (1) and the repeating structural unit of formula (2) being from 40 to 70 mol %:

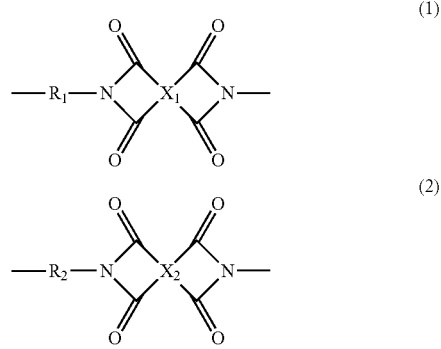

wherein $R_1$ represents a divalent group having from 6 to 22 carbon atoms containing at least one alicyclic hydrocarbon structure; $R_2$ represents a divalent chain aliphatic group having from 5 to 20 carbon atoms; and $X_1$ and $X_2$ each independently represent a tetravalent group having from 6 to 22 carbon atoms containing at least one aromatic ring.

As a result of earnest investigations by the present inventors, it has been found that the second object can be attained by a composite material containing a fiber material impregnated with a polyimide resin containing particular plural kinds of polyimide structural units combined at a particular ratio.

According to the second aspect, the present invention provides a composite material containing a fiber material (C) impregnated with a polyimide resin (A) containing a repeating structural unit represented by the aforementioned formula (1) and a repeating structural unit represented by the aforementioned formula (2), a content ratio of the repeating structural unit of formula (1) with respect to the total of the repeating structural unit of formula (1) and the repeating structural unit of formula (2) being from 40 to 70 mol %.

Advantageous Effects of Invention

In the present invention, a polyimide resin contains particular plural kinds of polyimide structural units at a particular ratio, and thus has, for example, a low melting point of 360° C. or less and a high glass transition temperature of 170° C. or more (preferably 200° C. or more). The polyimide resin having such a peculiar capability is capable of providing a polyimide resin composition that is capable of being easily processed by molding and prepared into a molded article excellent in heat resistance. Various additives may be added to the polyimide resin composition, thereby imparting a desired capability, for example, mechanical strength, flame resistance, design properties, slidability, heat aging resistance, and conductivity.

In the present invention, use of the particular polyimide resin facilitates preparing a composite with a fiber material, compared with use of conventional general polyimide resins, and is capable of imparting recyclability and molding processability to a composite material. The composite material of the present invention is far superior in heat resistance and mechanical strength to a composite material using a thermoplastic resin, such as a polyolefin resin or a polyamide resin.

BRIEF DESCRIPTION OF DRAWING

FIG. 1 is a diagram showing the FD-MS spectrum of a cyclic oligoimide of Production Example 5.

DESCRIPTION OF EMBODIMENTS

[Polyimide Resin Composition]

According to the first aspect, the polyimide resin composition of the present invention contains a polyimide resin (A) and an additive (B), the polyimide resin (A) containing a repeating structural unit represented by the following formula (1) and a repeating structural unit represented by the following formula (2), and the content ratio of the repeating structural unit of formula (1) with respect to the total of the repeating structural unit of formula (1) and the repeating structural unit of formula (2) is from 40 to 70 mol %;

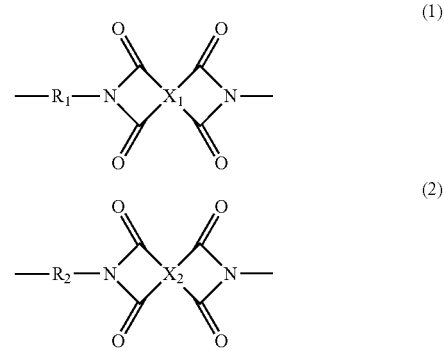

wherein $R_1$ represents a divalent group having from 6 to 22 carbon atoms containing at least one alicyclic hydrocarbon structure; $R_2$ represents a divalent chain aliphatic group having from 5 to 20 carbon atoms; and $X_1$ and $X_2$ each independently represent a tetravalent group having from 6 to 22 carbon atoms containing at least one aromatic ring.

<Polyimide Resin (A)>

The polyimide resin (A) contains a repeating structural unit represented by the aforementioned formula (1) and a repeating structural unit represented by the aforementioned formula (2), and the content ratio of the repeating structural unit of formula (1) with respect to the total of the repeating structural unit of formula (1) and the repeating structural unit of formula (2) is from 40 to 70 mol %. The polyimide resin (A) contains particular plural kinds of polyimide structural units combined at a particular ratio, and thus has a peculiar capability, for example, a low melting point of 360° C. or less and a high glass transition temperature of 170° C. or more (preferably 200° C. or more). Thus, a resin composition that possesses both molding processability and high heat resistance is obtained by use of the polyimide resin (A), unlike use of general polyimide resins lacking thermoplasticity or thermoplastic resins having a low glass transition temperature.

The polyimide resin (A) is excellent in molding processability, and an additive (B) may be added thereto during its heat melting. A resin composition containing the additive (B) may therefore be easily prepared.

When the additive (B) contains a filler (b1), a molded article obtained with the resin composition has high mechanical strength and is capable of maintaining its high mechanical strength even at a high temperature. When the additive (B) contains a flame retardant (b2), a molded article obtained with the resin composition is also excellent in flame resistance. When the additive (B) contains a colorant (b3), the polyimide resin (A) may be molded at a relatively low temperature. Hence, the colorant may be selected from a wide range, and it is easy to adjust the hue or impart design properties. The polyimide resin (A) is less colored than wholly aromatic polyimide resins and thus, is also excellent in color reproducibility.

When the additive (B) contains a slidability-improving agent (b4), a molded article obtained with the resin composition has high sliding characteristics. When the additive (B) contains an antioxidant (b5), a molded article obtained with the resin composition is also excellent in heat aging resistance. When the additive (B) contains a conductive agent (b6), a molded article obtained with the resin composition has desired conductivity.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

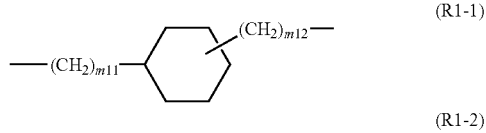
(R1-1)

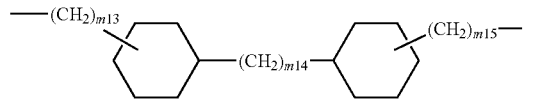
(R1-2)

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

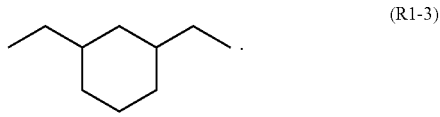
(R1-3)

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4);

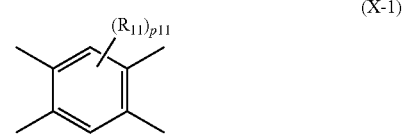
(X-1)

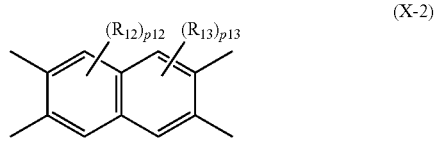
(X-2)

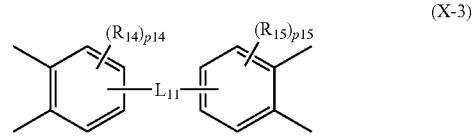
(X-3)

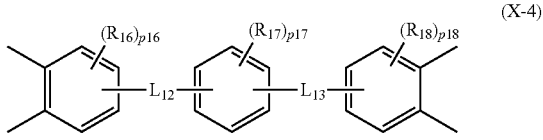
(X-4)

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 6 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 6 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 6 to 22 carbon atoms.

$X_1$ is particularly preferably a tetravalent group represented by the following formula (X-5) or (X-6):

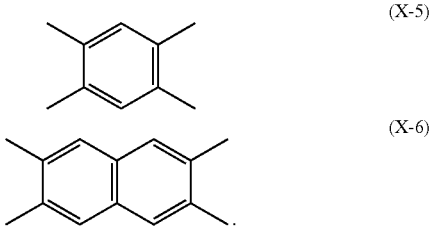

Next, the repeating structural unit of formula (2) will be described in detail below.

$R_2$ represents a divalent chain aliphatic group having from 5 to 20 carbon atoms (preferably from 5 to 16 carbon atoms, and more preferably from 5 to 12 carbon atoms). The chain aliphatic group herein means a group derived from a chain aliphatic compound, and the chain aliphatic compound may be either saturated or unsaturated, may be in the form of either a straight chain or a branched chain, and may contain a hetero atom, such as an oxygen atom.

$R_2$ is preferably an alkylene group having from 5 to 20 carbon atoms, more preferably an alkylene group having from 5 to 16 carbon atoms, further preferably an alkylene group having from 5 to 12 carbon atoms, and particularly preferably an alkylene group having from 6 to 10 carbon atoms. The alkylene group may be either a straight-chain alkylene group or a branched alkylene group, and is preferably a straight-chain alkylene group.

$R_2$ is particularly preferably a hexamethylene group.

Another preferred embodiment of $R_2$ is a divalent chain aliphatic group having from 5 to 20 carbon atoms (preferably from 5 to 16 carbon atoms, and more preferably from 5 to 12 carbon atoms) containing an ether group. Preferred examples of the group include a divalent group represented by the following formula (R2-1) or (R2-2);

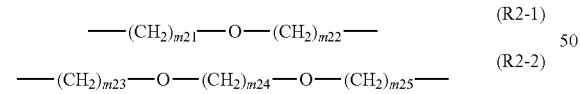

wherein $m_{21}$ and $m_{22}$ each independently represent an integer of 1-19, preferably 1-15, more preferably 1-11, and further preferably 2-6; and $m_{23}$ to $m_{25}$ each independently represent an integer of 1-18, preferably 1-14, more preferably 1-10, and further preferably 2-4.

$R_2$ is a divalent chain aliphatic group having from 5 to 20 carbon atoms (preferably from 5 to 16, and more preferably from 5 to 12 carbon atoms), and therefore $m_{21}$ and $m_{22}$ in the formula (R2-1) are selected in such a manner that the divalent group represented by the formula (R2-1) has from 5 to 20 carbon atoms (preferably from 5 to 16 carbon atoms, and more preferably from 5 to 12 carbon atoms), i.e., $m_{21}+m_{22}$ is from 5 to 20 (preferably from 5 to 16, and more preferably from 5 to 12).

Similarly, $m_{23}$ to $m_{25}$ in the formula (R2-2) are selected in such a manner that the divalent group represented by the formula (R2-2) has from 5 to 20 carbon atoms (preferably from 5 to 16 carbon atoms, and more preferably from 5 to 12 carbon atoms), i.e., $m_{23}+m_{24}+m_{25}$ is from 5 to 20 (preferably from 5 to 16, and more preferably from 5 to 12).

$X_2$ is defined similarly to $X_1$ in the formula (1), and preferred embodiments thereof are also the same.

The content ratio of the repeating structural unit of formula (1) with respect to the total of the repeating structural unit of formula (1) and the repeating structural unit of formula (2) is from 40 to 70 mol %. In the case where the content ratio of the repeating structural unit of formula (1) is in the above-described range, the polyimide resin (A) has a large crystallization rate with a crystallization half-time of 60 seconds or less, and thus the polyimide resin (A) of the present invention may be sufficiently crystallized in an ordinary injection molding cycle. The content ratio of the repeating structural unit of formula (1) with respect to the total of the repeating structural unit of formula (1) and the repeating structural unit of formula (2) is preferably from 40 to 60 mol %.

The content ratio of the total of the repeating structural unit of formula (1) and the repeating structural unit of formula (2) with respect to the total repeating units constituting the polyimide resin (A) is preferably from 50 to 100 mol %, more preferably from 75 to 100 mol %, further preferably from 80 to 100 mol %, and still further preferably from 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

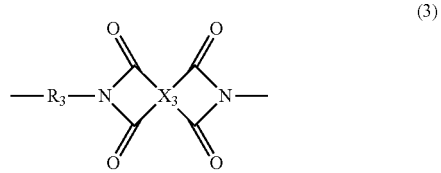

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

R₃ contains at least one aromatic ring, and preferably contains from 1 to 3 aromatic rings.

The aromatic ring may be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups, such as alkylene fluoride groups (e.g., —C(CF₃)₂— and —(CF₂)$_p$— wherein p is an integer of 1-10), as well as —CO—, —SO₂—, —SO—, —CONH—, and —COO—.

R₃ is preferably a divalent group represented by the following formula (R3-1) or (R3-2):

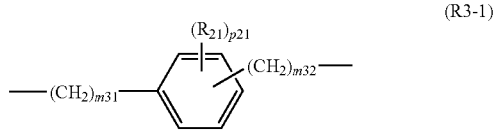

(R3-1)

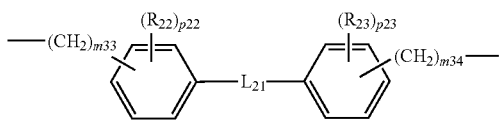

(R3-2)

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

R₃ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

X₃ is defined similarly to X₁ in the formula (1), and preferred embodiments thereof are also the same.

The content ratio of the repeating structural unit of formula (3) with respect to the total repeating units constituting the polyimide resin (A) is 25 mol % or less. The lower limit thereof is not particularly limited but needs to exceed 0 mol %.

The content ratio is preferably 5 mol % or more, and more preferably 7 mol % or more, in consideration of enhancement of the heat resistance, and is preferably 20 mol % or less, and more preferably 15 mol % or less, in consideration of maintenance of the crystallinity.

In the present invention, the polyimide resin (A) may further contain a repeating structural unit represented by the following formula (4):

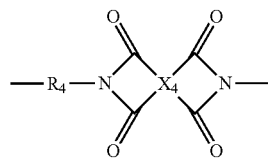

(4)

wherein R₄ represents a divalent group containing —SO₂— or —Si(R$_x$)(R$_y$)O—; R$_x$ and R$_y$ each independently represent a chain aliphatic group having from 1 to 3 carbon atoms or a phenyl group; and X₄ represents a tetravalent group having from 6 to 22 carbon atoms containing at least one aromatic ring.

The polyimide resin (A) preferably has, for example, a melting point of 360° C. or less and a glass transition temperature of 170° C. or more (preferably 200° C. or more).

The polyimide resin (A) preferably has an exothermic amount of the crystallization exothermic peak of 5 mJ/mg or more, the crystallization exothermic peak being observed when the resin is melted and then cooled at a cooling rate of 10° C./min or more in a differential scanning calorimeter.

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxyl groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3', 4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either a straight chain or a branched chain, and preferably has from 5 to 20 carbon atoms, more preferably from 5 to 16, and further preferably from 5 to 12. The linear moiety having from 5 to 20 carbon atoms may contain an ether bond in the course thereof. Preferred examples of the chain aliphatic diamine include 1,5-pentamethylenediamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof within the range of the present invention. Among these, a chain aliphatic diamine having from 6 to 10 carbon atoms is preferably used, and 1,6-hexamethylenediamine is particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably from 40 to 70 mol %.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, 1,3-diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

The molar ratio is preferably 12 mol % or less, more preferably 10 mol % or less, further preferably 5 mol % or less, and still further preferably 0 mol %, in consideration of reduction in the coloring of the polyimide resin (A).

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably one or more selected from a monoamine compound and a dicarboxylic acid compound. The charged amount of the end capping agent to be introduced is preferably from 0.0001 to 0.1 mol, and more preferably from 0.001 to 0.06 mol, per 1 mol of the aromatic tetracarboxylic acid and/or the derivative thereof.

Examples of the monoamine end capping agent include methylamine, ethylamine, propylamine, butylamine, benzylamine, 4-methylbenzylamine, 4-ethylbenzylamine, 4-dodecylbenzylamine, 3-methylbenzylamine, 3-ethylbenzylamine, aniline, 3-methylaniline and 4-methylaniline. Among these, benzylamine and aniline are preferred.

The dicarboxylic acid end capping agent is preferably a dicarboxylic acid compound, which may partially have a closed ring structure. Examples thereof include phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid and 4-cyclohexene-1,2-dicarboxylic acid. Among these, phthalic acid and phthalic anhydride are preferred.

As a polymerization method for producing the polyimide resin (A), a known polymerization method for producing a polyimide resin may be applied, and examples thereof include, for example, solution polymerization, melt polymerization, solid phase polymerization, suspension polymerization and the like while not particularly limited. Among these, suspension polymerization under a high temperature condition using an organic solvent is preferred. On performing suspension polymerization under a high temperature condition, the polymerization is preferably performed at 150° C. or more, and more preferably at from 180 to 250° C. The polymerization time may vary depending on the monomers used, and is preferably approximately from 0.5 to 6 hours.

The method for producing the polyimide resin (A) preferably includes the step of reacting the tetracarboxylic acid component with the diamine component in the presence of a solvent containing an alkylene glycol-based solvent represented by the following formula (I). In this way, the polyimide resin may be obtained in a powder form.

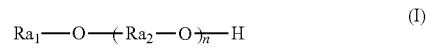

wherein $Ra_1$ represents a hydrogen atom or an alkyl group having from 1 to 4 carbon atoms; $Ra_2$ represents a linear alkylene group having from 2 to 6 carbon atoms; and n represents an integer of 1-3.

For obtaining a polyimide resin in a homogeneous powder form, it is considered desirable that the solvent should possess two characteristics in one-pot reaction: (1) uniformly dissolving a polyamic acid or uniformly dispersing a nylon salt; and (2) neither dissolving nor swelling a polyimide resin. The solvent containing an alkylene glycol-based solvent represented by the aforementioned formula (I) substantially satisfies these two characteristics.

The alkylene glycol-based solvent has a boiling point of preferably 140° C. or more, more preferably 160° C. or more, and further preferably 180° C. or more, in consideration of feasible polymerization reaction under high temperature conditions at normal pressure.

In the formula (I), $Ra_1$ represents a hydrogen atom or an alkyl group having from 1 to 4 carbon atoms and is preferably an alkyl group having from 1 to 4 carbon atoms, and more preferably a methyl group or an ethyl group.

In the formula (I), $Ra_2$ represents a linear alkylene group having from 2 to 6 carbon atoms and is preferably a linear alkylene group having 2 or 3 carbon atoms, and more preferably an ethylene group.

In the formula (I), n represents an integer of 1-3 and is preferably 2 or 3.

Specific examples of the alkylene glycol-based solvent include ethylene glycol monomethyl ether, diethylene glycol monomethyl ether (also known as 2-(2-methoxyethoxy) ethanol), triethylene glycol monomethyl ether, ethylene glycol monoethyl ether, diethylene glycol monoethyl ether (also known as 2-(2-ethoxyethoxy)ethanol), ethylene glycol monoisopropyl ether, diethylene glycol monoisopropyl ether, triethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monoisobutyl ether, ethylene glycol, and 1,3-propanediol. These solvents may each be used alone, or two or more solvents selected from them may be used in combination. Among these solvents, 2-(2-methoxyethoxy) ethanol, triethylene glycol monomethyl ether, 2-(2-ethoxyethoxy)ethanol, and 1,3-propanediol are preferred, and 2-(2-methoxyethoxy)ethanol and 2-(2-ethoxyethoxy)ethanol are more preferred.

The content of the alkylene glycol-based solvent in the solvent is preferably 30 mass % or more, more preferably 50 mass % or more, further preferably 75 mass % or more, and particularly preferably 95 mass % or more. The solvent may consist of the alkylene glycol-based solvent alone.

When the solvent contains the alkylene glycol-based solvent and an additional solvent, specific examples of the "additional solvent" include water, benzene, toluene, xylene, acetone, hexane, heptane, chlorobenzene, methanol, ethanol, n-propanol, isopropanol, N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylene sulfone, dimethylsulfoxide, o-cresol, m-cresol, p-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, dichloromethane, chloroform, 1,2-dichloroethane, 1,1,2-trichloroethane, dibromomethane, tribromomethane, 1,2-dibromoethane, and 1,1,2-tribromoethane. These solvents may each be used alone, or two or more solvents selected from them may be used in combination.

It is preferred that the solvent should contain from 5 to 35 mass % of γ-butyrolactone, because the resulting polyimide resin (A) has an improved hue.

Preferred examples of the method for producing the polyimide resin (A) include a method which involves separately preparing (a) a solution containing the tetracarboxylic acid component in the solvent containing the alkylene glycol-based solvent and (b) a solution containing the diamine component in the solvent containing the alkylene glycol-based solvent, then adding the solution (b) to the solution (a) or adding the solution (a) to the solution (b), thereby preparing (c) a solution containing a polyamic acid, and subsequently imidizing the polyamic acid by the heating of the solution (c), thereby synthesizing a polyimide resin.

The reaction of the tetracarboxylic acid component with the diamine component may be performed under normal pressure or under increased pressure. The reaction under normal pressure is preferred because a pressure-resistant vessel is unnecessary.

In the method for producing the polyimide resin (A), preferably, the tetracarboxylic acid component contains a tetracarboxylic dianhydride; the step of reacting the tetracarboxylic acid component with the diamine component includes: step (i) of adding (b) a solution containing the diamine component and the alkylene glycol-based solvent to (a) a solution containing the tetracarboxylic acid component and the alkylene glycol-based solvent, thereby preparing (c) a solution containing a polyamic acid; and step (ii) imidizing the polyamic acid by the heating of the solution (c), thereby providing a polyimide resin; and in the step (i), the solution (b) is added to the solution (a) such that the amount of the diamine component added per unit time with respect to 1 mol of the tetracarboxylic acid component is 0.1 mol/min or less, in consideration of reduction in the amount of by-products in the polyimide resin (A).

<Additive (B)>

The polyimide resin composition of the present invention contains an additive (B), in consideration of imparting of a desired capability to the polyimide resin (A). The additive (B) is preferably at least one selected from the group consisting of a filler (b1), a flame retardant (b2), a colorant (b3), a slidability-improving agent (b4), an antioxidant (b5), and a conductive agent (b6), in consideration of imparting of various capabilities, such as mechanical strength, flame resistance, design properties, slidability, heat aging resistance, and conductivity while using the original properties of the polyimide resin (A).

The content of the additive (B) in the polyimide resin composition is preferably from 0.0001 to 80 mass %, more preferably from 0.001 to 70 mass %, and further preferably from 0.01 to 65 mass %, in consideration of exertion of the effects of the additive and maintenance of the molding processability and heat resistance of the polyimide resin (A). The "content of the additive (B)" means the total content of the components (b1) to (b6).

[Filler (b1)]

In the polyimide resin composition of the present invention, the filler (b1) used as the additive (B) is capable of reinforcing the polyimide resin (A) and imparting excellent heat resistance and mechanical strength.

The shape of the filler (b1) is not particularly limited, and any of granular, plate-like, and fibrous fillers may be used. The particle size of the granular or plate-like filler may be appropriately selected according to the use application and the like of the polyimide resin composition, and the average particle size is in the range of preferably from 0.1 to 200 μm, and more preferably from 0.5 to 100 μm, in consideration of improvement in the molding processability of the polyimide resin composition and the mechanical strength of a molded article.

Examples of the fiber form of the fibrous filler include, but are not particularly limited to, cloths, mats, cut bundles, chopped fibers, filaments, and whiskers. The fiber form preferably has an average fiber length in the range of from 0.005 to 6 mm and an average fiber diameter in the range of from 0.005 to 100 µm, in consideration of imparting of excellent heat resistance and mechanical strength.

Any of inorganic and organic fillers may be used as the filler (b1), and an inorganic filler is preferred, in consideration of heat resistance and mechanical strength.

The method for measuring the average fiber length of the fibrous filler is not particularly limited, and the average fiber length may be determined, for example, by dissolving the resin composition in hexafluoroisopropanol (HFIP), concentrated sulfuric acid or the like and measuring the lengths of fibers remaining after the dissolution of the polyimide resin. The lengths of the fibers may be observed visually or under an optical microscope or a scanning electron microscope (SEM) or the like and measured directly or indirectly.

Among the inorganic fillers, examples of the granular or plate-like inorganic filler include silica, alumina, kaolinite, wollastonite, mica, talc, clay, sericite, magnesium carbonate, magnesium sulfate, calcium oxide, silicon carbide, antimony trisulfide, tin sulfide, copper sulfide, iron sulfide, bismuth sulfide, zinc sulfide, metal powders, glass powders, glass flake, and glass beads. Examples of the fibrous inorganic filler include glass fiber, carbon fiber, metal fiber, graphite fiber, silica fiber, silica/alumina fiber, alumina fiber, zirconia fiber, boron nitride fiber, silicon nitride fiber, boron fiber, potassium titanate whisker, aluminum borate whisker, magnesium-based whisker, and silicon-based whisker. Examples of the carbon fiber include polyacrylonitrile-based carbon fiber and pitch-based carbon fiber.

These inorganic fillers may be surface-treated.

Among the organic fillers, examples of the granular organic filler include cross-linked acrylic resin particles, wholly aromatic polyamide particles, and polyimide resin particles other than the polyimide resin (A) of the present invention.

Examples of the fibrous organic filler include organic synthetic fibers and natural fibers. An organic synthetic fiber is preferred, in terms of heat resistance and mechanical strength. Examples of the organic synthetic fiber include acrylic fiber, polyamide fiber, wholly aromatic polyamide fiber, and polyimide fiber other than the polyimide resin (A) of the present invention. At least one selected from the group consisting of acrylic fiber, poly(benzimidazole) fiber, and wholly aromatic polyimide fiber is preferred, in consideration of improvement in heat resistance and mechanical strength.

These fillers (b1) may each be used alone or may be used in combination of two or more thereof.

Among those described above, the filler (b1) used in the present invention is preferably at least one selected from the group consisting of silica, alumina, kaolinite, wollastonite, mica, talc, clay, sericite, magnesium carbonate, magnesium sulfate, glass beads, glass fiber, carbon fiber, alumina fiber, potassium titanate whisker, aluminum borate whisker, magnesium-based whisker, silicon-based whisker, acrylic fiber, poly(benzimidazole) fiber, and wholly aromatic polyimide fiber, more preferably at least one selected from the group consisting of silica, alumina, kaolinite, wollastonite, mica, talc, clay, sericite, magnesium carbonate, magnesium sulfate, glass beads, glass fiber, carbon fiber, and alumina fiber, further preferably at least one selected from the group consisting of talc, glass fiber, carbon fiber, and mica, and still further preferably at least one selected from the group consisting of talc, glass fiber, and carbon fiber.

The content of the filler (b1) in the polyimide resin composition is preferably from 0.1 to 70 mass %, more preferably from 1 to 50 mass %, and further preferably from 5 to 30 mass %, in the polyimide resin composition. When the content of the filler (b1) in the polyimide resin composition is 0.1 mass % or more, heat resistance and mechanical strength may be imparted to the polyimide resin composition. When the content of the filler (b1) in the polyimide resin composition is 70 mass % or less, excellent heat resistance and mechanical strength may be imparted while the molding processability of the polyimide resin composition may be maintained.

[Flame Retardant (b2)]

In the polyimide resin composition of the present invention, the flame retardant (b2) used as the additive (B) is capable of imparting excellent flame resistance. The flame retardant (b2) may be used without particular limitations, and examples thereof include halogen-based flame retardants, phosphorus-based flame retardants, metal oxide-based flame retardants, metal hydroxide-based flame retardants, metal salt-based flame retardants, nitrogen-based flame retardants, silicone-based flame retardants, and boron compound-based flame retardants.

The form of the flame retardant (b2) is not particularly limited, and a flame retardant that is solid or liquid at ordinary temperature may be used. The polyimide resin composition of the present invention is useful because even a solid flame retardant may be easily added or mixed. The shape, particle size, and average particle size and the like of the solid flame retardant are not particularly limited.

Examples of the halogen-based flame retardants include bromine-based flame retardants (tetrabromobisphenol A (TBA), hexabromobenzene, decabromodiphenyl ether, tetrabromoethane (TBE), tetrabromobutane (TBB), hexabromocyclododecane (HBCD), etc.), and chlorine-based flame retardants (chlorinated paraffin, chlorinated polyphenyl, diphenyl chloride, perchloropentacyclodecane, chlorinated naphthalene, etc.).

Any of inorganic and organic phosphorus-based flame retardants may be used.

Examples of the inorganic phosphorus-based flame retardant include red phosphorus, ammonium phosphates, such as monoammonium phosphate, diammonium phosphate, triammonium phosphate, and ammonium polyphosphate, and phosphoric acid amide.

Examples of the organic phosphorus-based flame retardant include phosphazene compounds, phosphoric acid ester compounds, and condensed phosphoric acid esters.

Examples of the phosphazene compounds include cyclic phenoxyphosphazene compounds, chain phenoxyphosphazene compounds, and cross-linked phenoxyphosphazene compounds.

Examples of the phosphoric acid ester compounds include trimethyl phosphate, triethyl phosphate, tributyl phosphate, triphenyl phosphate, tricresyl phosphate, trixylenyl phosphate, diphenyl cresyl phosphate, diphenyl-2-ethyl cresyl phosphate, tri(isopropylphenyl) phosphate, and 2-naphthyl diphenyl phosphate.

The condensed phosphoric acid esters are preferably aromatic condensed phosphoric acid esters, and examples thereof include 1,3-phenylenebis(dixylenyl phosphate), bisphenol A bis(diphenyl phosphate), and 1,3-phenylenebis (diphenyl phosphate).

Among these phosphorus-based flame retardants, an aromatic condensed phosphoric acid ester is preferred, in consideration of flame resistance and heat resistance.

Examples of commercially available organic phosphorus-based flame retardants include CR-733S, CR-741, PX-200, PX-201, and PX-202 (trade name, all produced by Daihachi Chemical Industry Co., Ltd.; aromatic condensed phosphoric acid esters), and SPS-100 (trade name, produced by Otsuka Chemical Co., Ltd.; phosphazene compound).

Examples of the metal oxide-based flame retardants include zinc molybdate, molybdenum trioxide, antimony trioxide, antimony pentaoxide, tin oxide, zinc stannate, iron oxide, manganese oxide, zirconium oxide, zinc oxide, molybdenum oxide, cobalt oxide, bismuth oxide, chromium oxide, nickel oxide, copper oxide, and tungsten oxide.

Examples of the metal hydroxide-based flame retardants include aluminum hydroxide, magnesium hydroxide, hydrotalcite, tin zinc hydroxide, barium hydroxide, calcium hydroxide, and zirconium hydroxide.

Examples of the organic metal salt-based flame retardants include alkali metal salts and alkaline earth metal salts of perfluoroalkanesulfonic acid, alkylbenzenesulfonic acid, alkyl halide benzenesulfonic acid, alkylsulfonic acid, naphthalenesulfonic acid or the like.

Examples of the nitrogen-based flame retardants include melamine compounds, triazine compounds, cyanuric acid compounds, isocyanuric acid compounds, and phenothiazine compounds.

The silicone-based flame retardants are not particularly limited, and an organic compound containing a silicon atom may be used. Examples thereof include organosiloxane and polyorganosiloxane. Examples of the organosiloxane include dimethylsiloxane, phenylmethylsiloxane, and diphenylsiloxane. Examples of the polyorganosiloxane include homopolymers of the organosiloxane (polydimethylsiloxane, polyphenylmethylsiloxane, etc.), and copolymers thereof. The polyorganosiloxane may be an oligomer. The organosiloxane or the polyorganosiloxane also includes modified forms having a substituent, such as an epoxy group, a hydroxyl group, an alkoxy group, a carboxyl group, an amino group or a substituted amino group (a dialkylamino group, etc.), an ether group, a vinyl group, or a (meth)acryloyl group, at the molecular end or in the backbone.

Examples of the boron compound-based flame retardants include zinc borate, zinc metaborate, and barium metaborate.

These flame retardants (b2) may each be used alone or may be used in combination of two or more thereof.

Among those described above, the flame retardant (b2) used in the present invention is preferably at least one selected from the group consisting of a halogen-based flame retardant, a phosphorus-based flame retardant, and a metal oxide-based flame retardant, in consideration of improvement in flame resistance, and is more preferably at least one selected from the group consisting of a phosphorus-based flame retardant and a metal oxide-based flame retardant, in consideration of the heat resistance of the flame retardant itself and reduction in environmental load.

The content of the flame retardant (b2) in the polyimide resin composition is preferably from 0.1 to 50 mass %, more preferably from 1 to 30 mass %, and further preferably from 5 to 30 mass %, in the polyimide resin composition. When the content of the flame retardant (b2) in the polyimide resin composition is 0.1 mass % or more, the flame resistance of the polyimide resin may be improved. When the content of the flame retardant (b2) in the polyimide resin composition is 50 mass % or less, the flame resistance of the polyimide resin may be improved while excellent characteristics, such as molding processability, heat resistance, and mechanical strength, may be maintained.

[Colorant (b3)]

In the polyimide resin composition of the present invention, the colorant (b3) used as the additive (B) is capable of adjusting the hue and imparting desired design properties. Since the polyimide resin composition of the present invention may be molded at a relatively low temperature, the colorant may be selected from a wide range. Thus, the polyimide resin composition of the present invention is useful because it is easy to adjust the hue or impart design properties.

The colorant (b3) is not particularly limited and may be appropriately selected from a pigment and a dye and the like according to use application and coloring purposes. The pigment and the dye may be used in combination.

Any of organic and inorganic pigments may be used as the pigment.

The organic pigment is not particularly limited and may be any compound that is classified as a pigment based on the color index (published by The Society of Dyers and Colourists). Examples thereof include: yellow pigments, such as C.I. Pigment Yellow 1, C.I. Pigment Yellow 3, C.I. Pigment Yellow 12, C.I. Pigment Yellow 13, C.I. Pigment Yellow 138, C.I. Pigment Yellow 150, C.I. Pigment Yellow 180, and C.I. Pigment Yellow 185; red pigments, such as C.I. Pigment Red 1, C.I. Pigment Red 2, C.I. Pigment Red 3, C.I. Pigment Red 254, and C.I. Pigment Red 177; blue pigments, such as C.I. Pigment Blue 15, C.I. Pigment Blue 15:3, C.I. Pigment Blue 15:4, and C.I. Pigment Blue 15:6; and other color pigments, such as C.I. Pigment Violet 23:19 and C.I. Pigment Green 36.

Examples of the inorganic pigment include, but are not particularly limited to: black inorganic pigments, such as carbon black, lampblack, acetylene black, bone black, thermal black, channel black, furnace black, and titanium black; and white inorganic pigments, such as titanium dioxide, barium sulfate, barium carbonate, calcium sulfate, calcium carbonate, muscovite, lithopone, alumina white, molybdenum white, lead white (zinc carbonate), zinc sulfide, zinc sulfate, silica, antimony trioxide, titanium phosphate, lead carbonate, lead hydroxide, basic zinc molybdate, basic calcium molybdate, zinc oxide/titanium dioxide composite oxide, aluminum oxide/magnesium oxide composite oxide, and calcium oxide/zirconium oxide composite oxide.

Among the black inorganic pigments, graphite and carbon black are preferred, in terms of black coloring properties, hiding properties and the like. Examples of commercially available products of graphite include BF-1AT, BF-3KT, G-6S, G-3, CMW-350, SMF, EMF, and WF-15C (all produced by Chuetsu Graphite Works Co., Ltd.). The graphite is not limited by its shape, such as flake, amorphous, or spherical graphite, and may be heat-expanded graphite. Also, the graphite may be natural graphite or artificial graphite.

Examples of commercially available products of carbon black include: MA series (produced by Mitsubishi Chemical Corporation); Printex series, Special Black series, and Color Black series (all produced by Evonik Japan Co., Ltd.); Monarch series, REGAL series, BLACK PEARLS 480, PEARLS 130, VULCAN XC72R, and ELFTEX-8 (all produced by Cabot Corporation); and RAVEN series (produced by Columbian Chemicals Co.).

Among the white inorganic pigments, at least one selected from the group consisting of titanium dioxide, calcium sulfate, and calcium carbonate is preferred, and titanium dioxide is more preferred, in terms of white coloring properties, hiding properties and the like. The titanium dioxide may be any of rutile and anatase types and the like.

Examples of commercially available products of titanium dioxide include: TA series and TR series (all produced by Fuji Titanium Industry Co., Ltd.); and R series, PF series, CR series, and PC series (all produced by Ishihara Sangyo Kaisha, Ltd.).

These organic pigments and inorganic pigments may be surface-treated, if necessary, by hydrophilizing treatment, graft treatment or the like.

The dye is not particularly limited and may be any compound that is classified as a dye based on the color index (published by The Society of Dyers and Colourists). Examples thereof include red, blue, green, yellow, orange, violet, brown, and black water-soluble acidic dyes and metal-containing dyes, basic dyes, cationic dyes, direct dyes, reactive dyes, and water-insoluble dispersive dyes, sulfide dyes, and vat dyes. The dye may be any of organic and inorganic dyes.

These colorants (b3) may each be used alone or may be used in combination of two or more thereof.

The colorant (b3) is preferably at least one selected from the group consisting of blue, green, black, and white colorants, and more preferably at least one selected from the group consisting of a blue dye, a green dye, a black pigment, and a white pigment, in consideration of adjustment of the hue of the polyimide resin composition and imparting of color. The blue or green colorant used is capable of canceling brown coloring derived from the polyimide resin (A) and producing a favorable hue. The black or white colorant used is capable of hiding coloring derived from the polyimide resin (A).

Among the aforementioned pigments or dyes, a blue or green one may be used as the blue or green colorant. Among these, examples of the blue or green dye include monoazo-based dyes, triarylmethane-based dyes, phthalocyanine-based dyes, and anthraquinone-based dyes. Among those described above, an anthraquinone-based dye is preferred.

Examples of commercially available products of the blue or green anthraquinone-based dye include MACROLEX Blue RR (trade name, produced by LANXESS K.K.), Diaresin Green C, Diaresin Blue G, Diaresin Blue J, and Diaresin Blue N (trade name, all produced by Mitsubishi Chemical Corporation,), Tetrazole Blue RLS (trade name, produced by Sandoz Ltd.), Solvent Blue 45, and Solvent Blue 87.

Among the aforementioned pigments or dyes, a black or white one may be used as the black or white colorant. Among these, at least one selected from the group consisting of graphite, carbon black, titanium dioxide, calcium sulfate, and calcium carbonate is preferred, and at least one selected from the group consisting of graphite and titanium dioxide is more preferred, in consideration of hiding of coloring derived from the polyimide resin (A). The graphite used is capable of further imparting slidability or light-blocking properties. The titanium dioxide used is capable of further imparting the effect of improving reflectivity. A polyimide resin composition capable of producing a high-reflectivity molded article is suitable for use as a reflector or the like.

From these viewpoints, the colorant (b3) is further preferably at least one selected from the group consisting of a blue dye, a green dye, graphite, carbon black, titanium dioxide, calcium sulfate, and calcium carbonate, in consideration of adjustment of the hue of the polyimide resin composition and imparting of color.

On the other hand, for imparting desired design properties to the polyimide resin composition, the colorant (b3) is preferably a pigment, in consideration of chromogenicity, weather resistance, and heat resistance. Any of the aforementioned organic pigments and inorganic pigments may be used as the pigment.

In the case of using the polyimide resin composition, for example, in a solar cell substrate, a blue or green pigment is preferably used as the colorant (b3).

The content of the colorant (b3) in the polyimide resin composition is preferably from 0.0001 to 50 mass %, more preferably from 0.01 to 40 mass %, and further preferably from 0.1 to 30 mass %, in the polyimide resin composition. When the content of the colorant (b3) in the polyimide resin composition is 0.0001 mass % or more, a desired hue or design properties may be imparted to the polyimide resin composition. When the content of the colorant (b3) in the polyimide resin composition is 50 mass % or less, design properties may be imparted while the excellent characteristics, such as molding processability, heat resistance, and mechanical strength, of the polyimide resin composition may be maintained.

[Slidability-Improving Agent (b4)]

In the polyimide resin composition of the present invention, the slidability-improving agent (b4) used as the additive (B) is capable of imparting excellent sliding characteristics.

The slidability-improving agent (b4) is not particularly limited as long as the slidability-improving agent (b4) is capable of improving slidability. A known slidability-improving agent may be used. The slidability-improving agent (b4) is, for example, at least one selected from the group consisting of a solid lubricant, a liquid lubricant, and a lubricious polymer. The polyimide resin composition of the present invention is useful because even a solid slidability-improving agent may be easily added or mixed.

The average particle size of the solid slidability-improving agent is not particularly limited, and the average particle size is preferably from 0.001 to 200 and more preferably from 0.01 to 100 in consideration of exertion of slidability and the molding processability of the polyimide resin composition.

Examples of the solid lubricant include molybdenum disulfide and metallic soaps. Examples of the liquid lubricant include mineral oils, synthetic oils, and waxes. Examples of the lubricious polymer include fluorine-based resins, polyolefins, and spherical phenols.

Examples of the metallic soaps include: metal salts of saturated or unsaturated long-chain fatty acids having 8 or more carbon atoms; and dodecylbenzenesulfonic acid metal salts. Examples of the saturated or unsaturated long-chain fatty acids having 8 or more carbon atoms include octylic acid, lauric acid, myristic acid, palmitic acid, stearic acid, arachic acid, behenic acid, cerotinic acid, montanic acid, melissic acid, lauroleic acid, myristoleic acid, oleic acid, elaidic acid, linoleic acid, linolenic acid, arachidonic acid, gadoleic acid, and erucic acid. Examples of the metals constituting the metallic soaps include lithium, magnesium, calcium, barium, and zinc.

Examples of the metallic soaps include zinc octylate, zinc laurate, lithium stearate, magnesium stearate, calcium stearate, zinc stearate, and zinc ricinolate.

Examples of the mineral oils include paraffin-based mineral oils, naphthene-based mineral oils, aromatic mineral oils, and their mixed oils. Examples of the synthetic oils include oxygen-containing organic compounds containing at least one group selected from an ether group, an ester group, a ketone group, a carbonate group, and a hydroxy group in the molecule, and oxygen-containing organic compounds containing a heteroatom, such as S, P, F, Cl, Si, or N, together with the group. Examples of the oxygen-containing organic compounds as the synthetic oils include polyalkylene glycol, polyvinyl ether, polyether, polyester, polyol ester, carbonate derivatives, polyether ketone, and fluorinated oil.

Examples of the waxes include hydrocarbon-based waxes, such as paraffin-based waxes having 24 or more carbon atoms, olefin-based waxes having 26 or more carbon atoms, alkylbenzene having 28 or more carbon atoms, and microcrystalline waxes having crystalline substances, and plant-derived carnauba wax.

Examples of the fluorine-based resins include polytetrafluoroethylene (PTFE), polytetrafluoroethylene-perfluoroalkoxyethylene copolymers, and polytetrafluoroethylene-polyhexafluoropropylene copolymers. Among these, polytetrafluoroethylene is preferred, in terms of improvement in slidability. Examples of commercially available products of polytetrafluoroethylene include KT-300M, KT-400M, KT-600M, KTL-450, KTL-610, KTL-620, KTL-20N, KTL-10N, KTL-8N, KTL-4N, KTL-2N, KTL-1N, KTL-8F, and KTL-500F (trade name, all produced by Kitamura Ltd.), and TF9201Z, TF9205, and TF9207 (trade name, all produced by Sumitomo 3M Ltd.).

Any of liquid and solid fluorine-based resins may be used, and a solid fluorine-based resin is preferably used, in consideration of exertion of slidability.

Examples of the polyolefins include homopolymers and copolymers of ethylene or α-olefin, and modified polyolefins, such as oxidized polyethylene. The polyolefin is preferably at least one selected from the group consisting of polyethylene and polypropylene, and more preferably polyethylene, in consideration of versatility and slidability.

The molecular weight of the polyolefin is not particularly limited. Any of liquid and solid polyolefins may be used, and a solid polyolefin is preferably used, in consideration of exertion of slidability.

A spherical phenol prepared by curing a spherical phenol resin obtained by the suspension polymerization of a phenol compound and an aldehyde compound in the presence of a catalyst may be preferably used.

Examples of the phenol compound include, but are not particularly limited to: phenol; alkylphenols, such as cresol, xylenol, ethylphenol, isopropylphenol, butylphenol, p-tert-butylphenol, p-tert-amylphenol, p-octylphenol, p-nonylphenol, and p-cumylphenol; monohydric phenol compounds, such as halogenated phenol, p-phenylphenol, aminophenol, nitrophenol, dinitrophenol, trinitrophenol, 1-naphthol, and 2-naphthol; and polyhydric phenol compounds, such as resorcinol, alkylresorcinol, pyrogallol, catechol, alkylcatechol, hydroquinone, alkylhydroquinone, phloroglucinol, bisphenol A, bisphenol F, bisphenol S, and dihydroxynaphthalene.

Examples of the aldehydes include formaldehyde, paraformaldehyde, trioxane, acetaldehyde, propionaldehyde, polyoxymethylene, chloral, hexamethylenetetramine, furfural, glyoxal, n-butylaldehyde, caproaldehyde, allylaldehyde, benzaldehyde, crotonaldehyde, acrolein, tetraoxymethylene, phenylacetaldehyde, o-tolualdehyde, and salicylaldehyde.

The catalyst for use in the reaction between the phenol compound and the aldehyde compound is generally an alkaline catalyst. Examples of the alkaline catalyst include, but are not particularly limited to: amine compounds, such as ammonia, primary amine compounds, secondary amine compounds, and tertiary amine compounds; and hydroxides of alkali metals, such as sodium hydroxide and potassium hydroxide.

The particle size of the spherical phenol is not particularly limited, and the preferred average particle size is as mentioned above.

These slidability-improving agents (b4) may each be used alone or may be used in combination of two or more thereof.

Among those described above, the slidability-improving agent (b4) used in the present invention is preferably at least one selected from the group consisting of molybdenum disulfide, a metallic soap, a mineral oil, a synthetic oil, a wax, a fluorine-based resin, a polyolefin, and a spherical phenol, and is more preferably at least one selected from the group consisting of a fluorine-based resin and a polyolefin, further preferably a fluorine-based resin, and still further preferably polytetrafluoroethylene, in consideration of improvement in slidability.

The content of the slidability-improving agent (b4) in the polyimide resin composition is preferably from 0.1 to 50 mass %, more preferably from 5 to 40 mass %, and further preferably from 7 to 25 mass %, in the polyimide resin composition. When the content of the slidability-improving agent (b4) in the polyimide resin composition is 0.1 mass % or more, the slidability of the polyimide resin composition may be improved. When the content of the slidability-improving agent (b4) in the polyimide resin composition is 50 mass % or less, excellent slidability may be imparted while the molding processability and mechanical strength of the polyimide resin composition may be maintained.

[Antioxidant (b5)]

In the polyimide resin composition of the present invention, the antioxidant (b5) used as the additive (B) is capable of imparting excellent heat aging resistance. Any antioxidant may be used as the antioxidant (b5) without particular limitations, and examples thereof include phenol-based antioxidants, sulfur-based antioxidants, phosphorus-based antioxidants, copper-based antioxidants, and amine-based antioxidants.

The form of the antioxidant (b5) is not particularly limited, and an antioxidant that is solid or liquid at ordinary temperature may be used. The polyimide resin composition of the present invention is useful because even a solid antioxidant may be easily added or mixed.

The phenol-based antioxidants are not particularly limited, and a known compound that has a phenol structure and has functions as an antioxidant may be used. Examples thereof include n-octadecyl-β-(4'-hydroxy-3',5'-di-tert-butylphenol)propionate, 2-tert-butyl-6-(3'-tert-butyl-5'-methyl-2'-hydroxybenzyl)-4-methylphenylacrylate, 2,6-di-tert-butyl-4-(N,N-dimethylaminomethyl)phenol, 3,5-di-tert-butyl-4-hydroxybenzylphosphonate diethyl ester, 2,2'-methylenebis(4-methyl-6-tert-butylphenol), 2,2'-methylenebis(4-ethyl-6-tert-butylphenol), 4,4'-methylenebis(2,6-di-tert-butylphenol), 2,2'-methylenebis(4-methyl-6-cyclohexylphenol), 2,2'-dimethylene-bis(6-α-methyl-benzyl-p-cresol), 2,2'-ethylidene-bis(4,6-di-tert-butylphenol), 2,2'-butylidene-bis(4-methyl-6-tert-butylphenol), 4,4'-butylidenebis(3-methyl-6-tert-butylphenol), triethylene glycol-N-bis-3-(3-tert-butyl-4-hydroxy-5-methylphenyl)propionate, 1,6-hexanediolbis[3-(3,5-di-tert-butyl-4-hydroxyphenyl)]propionate, bis[2-tert-butyl-4-methyl-6-(3-tert-butyl-5-methyl-2-hydroxybenzyl)phenyl]terephthalate, 3,9-bis{2-[3-(3-tert-butyl-4-hydroxy-5-methylphenyl)propionyloxy]-1,1,-dimethylethyl}-2,4,8,10-tetraoxaspiro[5,5]undecane, 4,4'-thiobis(6-tert-butyl-m-cresol), 4,4'-thiobis(3-methyl-6-tert-butylphenol), 2,2'-thiobis(4-methyl-6-tert-butylphenol), bis(3,5-di-tert-butyl-4-hydroxybenzyl)sulfide, 4,4'-di-thiobis(2,6-di-tert-butylphenol), 4,4'-tri-thiobis(2,6-di-tert-butylphenol), 2,4- bis(n-octylthio)-6-(4-hydroxy-3',5'-di-tert-butylanilino)-1,3,5-triazine, N,N'-hexamethylenebis-(3,5-di-tert-butyl-4-hydroxyhydrocinnamide), N,N'-bis[3-(3,5-di-tert-butyl-4-hydroxyphenyl)propionyl]hydrazine, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxyphenyl)isocyanurate, tris(3,5-di-tert-butyl-4-hydroxybenzyl)isocyanurate, 1,3,5-tris(4-tert-butyl-3-hydroxy-2,6-dimethylbenzyl)isocyanurate, 1,3,5-tris-2-[3-(3,5-di-tert-butyl-4-hydroxyphenyl)propionyloxy]ethylisocyanurate, tetrakis[methylene-3-(3',5'-di-tert-butyl-4-hydroxyphenyl)propionate]methane, and vitamin E. Among these, a hindered phenol-based antioxidant having a di-tert-butyl-hydroxyphenyl structure is preferred.

Examples of commercially available products of the phenol-based antioxidants include Irganox 1010, Irganox 1098, Irganox 1035, Irganox 1078, Irganox 1135, Irganox 1330, Irganox 1425, Irganox 259, Irganox 3114, and Irgamod 295 (trade name, all produced by BASF Japan Ltd.).

The sulfur-based antioxidants are preferably dialkyl thiodipropionates and polyhydric alcohol esters of alkylthiopropionic acids. Examples thereof include dilauryl-3,3'-thiodipropionate, dimyristyl-3,3'-thiodipropionate, distearyl-3,3'-thiodipropionate, lauryl stearyl-3,3'-thiodipropionate, dioctadecyl sulfide, and pentaerythritol tetrakis(3-laurylthiopropionate). Examples of commercially available sulfur-based antioxidants include SUMILIZER TP-D (pentaerythritol tetrakis(3-laurylthiopropionate)), SUMILIZER TPS (distearyl-3,3'-thiodipropionate), SUMILIZER TPM (dimyristyl-3,3'-thiodipropionate), and SUMILIZER TPL-R (dilauryl-3,3'-thiodipropionate) (trade name, all produced by Sumitomo Chemical Co., Ltd.).

Examples of the phosphorus-based antioxidants include: phosphites, such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite, bis(2,4-di-tert-butylphenyl)pentaerythritol diphosphite, tris(2,4-di-tert-butylphenyl)phosphite, distearylpentaerythritol diphosphite, tetra(tridecyl)-4,4'-isopropylidenediphenyl diphosphite, and 2,2-methylenebis(4,6-di-tert-butylphenyl)octyl phosphite; and oxaphosphaphenanthrene oxides, such as 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, and 10-decyloxy-9,10-dihydro-9-oxa-10-phosphaphenanthrene-10-oxide.

Examples of commercially available phosphorus-based antioxidants include Irgafos 168, Irgafos 12, and Irgafos 38 (trade name, all produced by BASF Japan Ltd.), and ADK STAB 329K and ADK STAB PEP36 (trade name, all produced by ADEKA Corporation).

Examples of the copper-based antioxidants include copper I oxide, copper I chloride, and copper dimethyldithiocarbamate.

The amine-based antioxidants are not particularly limited, and a known amine-based antioxidant may be used. A hindered amine-based antioxidant is preferred, in consideration of improvement in heat aging resistance.

Examples of the hindered amine-based antioxidant include bis(2,2,6,6-tetramethyl-4-piperidyl)sebacate, bis(N-methyl-2,2,6,6-tetramethyl-4-piperidyl)sebacate, N,N'-bis(2,2,6,6-tetramethyl-4-piperidyl)-1,6-hexamethylenediamine, 2-methyl-2-(2,2,6,6-tetramethyl-4-piperidyl)amino-N-(2,2,6,6-tetramethyl-4-piperidyl)propionamide, tetrakis(2,2,6,6-tetramethyl-4-piperidyl)-1,2,3,4-butanetetracarboxylate, poly[{6-(1,1,3,3-tetramethylbutyl)imino-1,3,5-triazine-2,4-diyl}{(2,2,6,6-tetramethyl-4-piperidyl)imino}hexamethyl{(2,2,6,6-tetramethyl-4-piperidyl)imino}], poly[(6-morpholino-1,3,5-triazine-2,4-diyl){(2,2,6,6-tetramethyl-4-piperidyl)imino}hexamethine{(2,2,6,6-tetramethyl-4-piperidyl)imino}], polycondensates of dimethyl succinate and 1-(2-hydroxyethyl)-4-hydroxy-2,2,6,6-tetramethylpiperidine, and N,N'-4,7-tetrakis[4,6-bis{N-butyl-N-(1,2,2,6,6-pentamethyl-4-piperidyl)amino}-1,3,5-triazin-2-yl]-4,7-diazadecane-1,10-diamine.

Examples of commercially available hindered amine-based antioxidants include CHIMASSORB 2020 FDL, CHIMASSORB 944 FDL, TINUVIN PA144, TINUVIN 765, and TINUVIN 770 DF (trade name, all produced by BASF Japan Ltd.).

Examples of other amine-based antioxidants include: monoalkydiphenylamine compounds, such as monooctyldiphenylamine and monononyldiphenylamine; dialkydiphenylamine compounds, such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, and 4,4'-dinonyldiphenylamine; polyalkyldiphenylamine compounds, such as tetrabutyldiphenylamine, tetrahexyldiphenylamine, tetraoctyldiphenylamine, and tetranonyldiphenylamine; and naphthylamine compounds, such as alkyl-substituted phenyl-α-naphthylamine.

These antioxidants (b5) may each be used alone or may be used in combination of two or more thereof. Particularly, the antioxidants tend to offer higher heat aging resistance, and thus are preferred, when a primary antioxidant (e.g., a phenol-based antioxidant) that scavenges radicals formed at the initial stage of reaction, and a secondary antioxidant (e.g., a sulfur-based antioxidant) that decomposes hydroperoxide formed from the primary antioxidant are used in combination.

Among those described above, the antioxidant (b5) used in the present invention is preferably at least one selected from the group consisting of a phenol-based antioxidant, a sulfur-based antioxidant, a phosphorus-based antioxidant, and an amine-based antioxidant, more preferably at least one selected from the group consisting of a phenol-based antioxidant, a sulfur-based antioxidant, and a phosphorus-based antioxidant, further preferably at least one selected from the group consisting of a phenol-based antioxidant and a sulfur-based antioxidant, and particularly preferably combined use of a phenol-based antioxidant and a sulfur-based antioxidant, in consideration of improvement in heat aging resistance.

The content of the antioxidant (b5) in the polyimide resin composition is preferably from 0.01 to 10 parts by mass, more preferably from 0.05 to 5 parts by mass, and further preferably from 0.1 to 3 parts by mass, with respect to 100 parts by mass of the polyimide resin (A). When the content of the antioxidant (b5) is 0.01 parts by mass or more with respect to 100 parts by mass of the polyimide resin (A), heat aging resistance may be imparted to the polyimide resin composition. When the content of the antioxidant (b5) is 10 parts by mass or less with respect to 100 parts by mass of the polyimide resin (A), excellent heat aging resistance may be imparted while the excellent characteristics, such as molding processability, heat resistance, and mechanical strength, of the polyimide resin composition may be maintained.

In the case of using a phenol-based antioxidant and a sulfur-based antioxidant in combination, the total content thereof preferably falls within the aforementioned range. The content ratio of the phenol-based antioxidant to the sulfur-based antioxidant (phenol-based antioxidant/sulfur-based antioxidant) is preferably in the range of from 0.5 to 2 by mass.

[Conductive Agent (b6)]

In the polyimide resin composition of the present invention, the conductive agent (b6) used as the additive (B) is capable of imparting desired conductivity according to use application and purposes.

The conductive agent (b6) may be used without particular limitations as long as the conductive agent is capable of imparting desired conductivity. Examples thereof include carbon-based conductive agents, metal-based conductive agents, metal oxide-based conductive agents, and surfactants.

Examples of the carbon-based conductive agents include carbon nanotube and fullerene.

Examples of the metals constituting the metal-based conductive agents include Au, Ag, Cu, Al, Fe, Ni, Pd, and Pt. Examples of the metal oxides constituting the metal oxide-based conductive agents include antimony tin oxide (ATO), indium tin oxide (ITO), aluminum zinc oxide (AZO), and fluorine-doped tin oxide (FTO).

Examples of the surfactants that may be used as the conductive agent (b6) include quaternary ammonium, sorbitan lauric acid ester, fatty acid monoglyceride, glycerol borate alkylate, polyglycerin ester, alkyl trimethylammonium bromide, polyoxyethylene alkylamine, stearyl trimethylammonium chloride, polyoxyethylene dodecylamine, and betaine-based amphoteric surfactants.

Among those described above, the conductive agent (b6) used in the present invention is preferably a carbon-based conductive agent or a metal-based conductive agent, in consideration of conductivity and heat resistance.

These conductive agents (b6) may each be used alone or may be used in combination of two or more thereof.

The content of the conductive agent (b6) in the polyimide resin composition is not particularly limited as long as the conductive agent in the amount is capable of imparting desired conductivity. When the polyimide resin composition is used in, for example, a fixing belt or an intermediate transfer belt for use in electrophotographic image forming apparatuses, such as copiers, printers, laser printers, facsimiles and their complex apparatuses, the content of the conductive agent (b6) may be any amount in which the resulting molded article is capable of exerting conductivity on the order of preferably from $1\times10^8$ to $1\times10^{13}$ [$\Omega/\square$] in terms of surface resistance and from $1\times10^6$ to $1\times10^{12}$ [$\Omega$-cm] in terms of volume resistance.

From these viewpoints, the content of the conductive agent (b6) in the polyimide resin composition is preferably from 0.1 to 60 mass %, more preferably from 1 to 40 mass %, and further preferably from 5 to 35 mass %, in the polyimide resin composition. When the content of the conductive agent (b6) in the polyimide resin composition is 0.1 mass % or more, conductivity may be imparted to the polyimide resin composition. When the content of the conductive agent (b6) in the polyimide resin composition is 60 mass % or less, desired conductivity may be imparted while the molding processability and mechanical strength of the polyimide resin composition may be maintained.

In the polyimide resin composition of the present invention, use of an additive having conductivity among various kinds of additives (B) mentioned above, such as the filler (b1), the flame retardant (b2), and the colorant (b3), does not hinder imparting of desired conductivity. Conductivity may be imparted to the polyimide resin composition for use in, for example, a fixing belt or an intermediate transfer belt for electrophotographic image forming apparatuses by adding carbon black listed as an example of the colorant (b3) among the additives (B).

For example, the additives (B) selected from the components (b1) to (b6) may each be used alone or may be used in combination of two or more thereof, according to a desired capability.

<Other Components>

The polyimide resin composition of the present invention may be mixed with other resins according to purposes and used. Examples of the resins include polyetheretherketone, polyether imide, polysulfone, polyphenylenesulfide, polyamide, polyamideimide, polyphenyleneether, polyacrylate, polyester, polycarbonate, liquid crystal polymers, and polyimides other than the polyimide resin (A).

The polyimide resin composition of the present invention may also be mixed, if necessary, with optional components, such as a delusterant, a nucleating agent, a plasticizer, an antistatic agent, an anti-coloring agent, an anti-gelling agent, and a resin modifier, without impairing its characteristics. Examples of the resin modifier include a cyclic oligoimide mentioned later.

In the case of using the filler (b1) as the additive (B), among these optional components, a nucleating agent is preferably used in combination therewith for improving the degree of crystallinity.

In the case of using the flame retardant (b2) as the additive (B), at least one selected from the group consisting of the filler (b1), the antioxidant (b5), and a nucleating agent is preferably used in combination therewith.

In the case of using the colorant (b3) as the additive (B), at least one selected from the group consisting of a ultraviolet absorber and the antioxidant (b5) is preferably used in combination therewith, in consideration of suppression of change in color tone caused by the degradation or the like of the polyimide resin.

In the case of using the slidability-improving agent (b4) as the additive (B), a nucleating agent is preferably used in combination therewith, in consideration of improvement in the short-term high-temperature sliding characteristics of the polyimide resin, and the antioxidant (b5) is preferably used in combination therewith, in consideration of securing of the long-term high-temperature sliding characteristics.

A known nucleating agent may be used.

Examples of the ultraviolet absorber that may be used include, but are not particularly limited to: benzotriazole-based ultraviolet absorbers, such as 2-(2-hydroxy-5-methylphenyl)benzotriazole, 2-(2-hydroxy-5-butylphenyl)benzotriazole, 2-(2-hydroxy-5-octylphenyl)benzotriazole, 2-(3-t-butyl-2-hydroxy-5-methylphenyl)-5-chlorobenzotriazole, and 2-(3,5-di-t-amyl-2-hydroxyphenyl)benzotriazole; benzophenone-based ultraviolet absorbers, such as 2-hydroxy-4-methoxybenzophenone and 2-hydroxy-4-n-octyloxybenzophenone; triazine-based ultraviolet absorbers, such as 2-[4,6-bis(2,4-dimethylphenyl)-1,3,5-triazin-2-yl]-5-(octyloxy)phenol and 2-(4,6-diphenyl-1,3,5-triazin-2-yl)-5-(hexyloxy)phenol; and salicylate-based ultraviolet absorbers, such as p-tert-butylphenyl salicylate and phenyl salicylate.

The amount of the ultraviolet absorber added is generally in the range of from 0.1 to 5 mass % in the resin composition.

These ultraviolet absorbers may each be used alone or may be used in combination of two or more thereof.

[Molded Article]

The molded article of the present invention contains the polyimide resin composition containing various kinds of components mentioned above. Since the polyimide resin (A) is melted essentially at a temperature of 360° C. or less, a molded article may be produced by heat-molding the polyimide resin composition of the present invention containing the polyimide resin (A). Examples of the heat molding method include injection molding, extrusion molding, blow molding, heat press molding, vacuum molding, pneumatic molding, laser molding, welding and heat adhesion, and the polyimide resin composition of the present invention may be molded by any molding method that includes a heat melting step.

The method for producing a molded article according to the present invention preferably includes the step of heat-molding the polyimide resin composition of the present invention at from 300 to 400° C. Examples of specific procedures include the following method.

First, the additive (B) and, if necessary, various kinds of optional components are added to the polyimide resin (A) and dry-blended therewith. This blend is then introduced in an extruder, and melt-kneaded and extruded preferably at from 300 to 400° C., thereby preparing pellets consisting of the polyimide resin composition of the present invention. Alternatively, the polyimide resin (A) is introduced in an extruder and melted preferably at from 300 to 400° C., and the additive (B) may be introduced therein, melt-kneaded with the polyimide resin (A) in the extruder, and extruded, thereby preparing the aforementioned pellets.

The pellets may be dried, then introduced in various kinds of molding machines, and heat-molded preferably at from 300 to 400° C., thereby producing a molded article having a desired shape.

Since the polyimide resin composition of the present invention may be heat-molded by extrusion molding or the like at a relatively low temperature of from 300 to 400° C., the polyimide resin composition of the present invention is excellent in molding processability and may be easily produced into a molded product having a desired shape. The temperature of the heat molding is preferably from 320 to 380° C., and more preferably from 330 to 370° C.

The bending strength of the molded article of the present invention containing the filler (b1) as the additive (B) when molded into a plate-like shape of 80 mm×10 mm×4 mm thick may be in the range of preferably from 60 to 300 MPa, and more preferably from 100 to 250 MPa. In this case, its flexural modulus may be in the range of preferably from 2.5 to 35 GPa, and more preferably from 10 to 30 GPa.

The tensile strength of the molded article of the present invention containing the filler (b1) as the additive (B) when molded into a JIS K7139 type A test specimen may be in the range of preferably from 50 to 280 MPa, and more preferably from 60 to 260 MPa. In this case, its tensile modulus may be in the range of preferably from 2.4 to 30 GPa, and more preferably from 10 to 30 GPa.

The bending strength and the flexural modulus may be measured according to JIS K7171, and the tensile strength and the tensile modulus may be measured according to JIS K7113.

The bending strength of the molded article of the present invention containing at least one selected from the group consisting of the flame retardant (b2), the colorant (b3), the slidability-improving agent (b4), and the antioxidant (b5) as the additive (B) when molded into a plate-like shape of 80 mm×10 mm×4 mm thick may be in the range of preferably from 50 to 170 MPa, and more preferably from 70 to 160 MPa. In this case, its flexural modulus may be in the range of preferably from 2.4 to 3.5 GPa, and more preferably from 2.6 to 3.2 GPa.

The tensile strength of the molded article of the present invention containing at least one selected from the group consisting of the flame retardant (b2), the colorant (b3), the slidability-improving agent (b4), and the antioxidant (b5) as the additive (B) when molded into a JIS K7139 type A test specimen may be in the range of preferably from 50 to 160 MPa, and more preferably from 60 to 140 MPa. In this case, its tensile modulus may be in the range of preferably from 2.4 to 3.5 GPa, and more preferably from 2.6 to 3.2 GPa.

The bending strength and the flexural modulus may be measured according to JIS K7171, and the tensile strength and the tensile modulus may be measured according to JIS K7113.

The molded article of the present invention containing the flame retardant (b2) as the additive (B) is excellent in flame resistance. The degree of flame resistance may be confirmed by simply measuring an oxygen index as an index for flame resistance. The oxygen index refers to an oxygen concentration required to continue combustion. When the oxygen index exceeds 21, combustion is not continued in the air under general conditions. In general, an oxygen index exceeding 26 indicates flame resistance. The molded article of the present invention containing the flame retardant (b2) as the additive (B) has an oxygen index in the range of preferably 27 or more, and more preferably 29 or more, when the oxygen index is measured. Specifically, the oxygen index may be measured by the method described in Examples.

The molded article of the present invention containing the slidability-improving agent (b4) as the additive (B) has high sliding characteristics. In the case of using the molding method and the measurement method described herein, for example, the molded article of the present invention containing the slidability-improving agent (b4) as the additive (B) has a coefficient of static friction of preferably 0.50 or less, more preferably 0.40 or less, and further preferably 0.20 or less. Specifically, the coefficient of static friction may be measured by the method described in Examples.

The molded article of the present invention containing the antioxidant (b5) as the additive (B) is excellent in heat aging resistance. A general molded article containing a polyimide resin may undergo heat ageing, such as coloring associated with oxidative degradation or reduction in mechanical strength, by the application of heat. However, in the case of preparing a molded article with the polyimide resin composition of the present invention containing the antioxidant (b5) as the additive (B), for example, a rise in YI value caused by the oxidative degradation may be suppressed. Specifically, the heat aging resistance may be evaluated by the method described in Examples.

The molded article of the present invention containing the conductive agent (b6) as the additive (B) has desired conductivity according to use application and purposes.

Examples of the shape of the molded article of the present invention include, but are not particularly limited to, a film, a sheet, a strand, pellets, fibers, a round bar, a rectangular bar, a sphere, a pipe, a tube, and a seamless belt.

Typical examples of the use application of the molded article of the present invention include, but are not particularly limited to, films, fibers, heat-resistant adhesives, color filters, solar cell substrates, bearings for automobiles, bearings for copiers, and fixing belts or intermediate transfer belts for various kinds of electrophotographic image forming apparatuses, such as copiers, printers, facsimiles and their complex apparatuses.

The molded article of the present invention containing the filler (b1) as the additive (B) is excellent in heat resistance and mechanical strength and is preferably used in, for example: members for automobiles, such as washers, needle bearings, seal rings, gears, ABS parts, and clutch rings;

electronic members for surface mounting; gaskets for condensers; relay switch housings; bearings for copiers; IC chip trays and liquid crystal display (LCD) conveyance rollers; silicon wafer carriers; members for mobile phones; parts for compressors, such as pumps, valves, seals, and hoses; power generating apparatuses; and ball bearings.

The molded article of the present invention containing the flame retardant (b2) as the additive (B) is excellent in heat resistance and flame resistance and is preferably used in, for example: electric or electronic members, such as optical connectors, optical pickups, surface mounting members, lamp sockets, transformers, heat dissipating spacers, power modules, and reflectors; automobile members, such as engine fittings, hoses, hydraulic lines, clutch lines, and brake lines; home electronics members; and bearings.

The polyimide resin composition of the present invention containing the flame retardant (b2) as the additive (B) may be used as a heat-resistant adhesive by applying heat and pressure, and thus may be applied to a flexible board, a copper-clad laminated plate and the like.

The molded article of the present invention containing the colorant (b3) as the additive (B) is preferably used in reflectors for illumination, reflectors for automobiles, solar cell substrates, color filters, covering materials for electronic parts, bearings and the like.

The molded article of the present invention containing the slidability-improving agent (b4) as the additive (B) has excellent sliding characteristics, and in particular, is preferably used in various kinds of bearings, such as bearings for automobiles and bearings for copiers, gears, bearings, bushes, mechanical seals, seals for transmissions and the like.

The polyimide resin composition of the present invention containing the antioxidant (b5) as the additive (B) may be used as a heat-resistant adhesive by applying heat and pressure, and thus may be applied to a flexible board, a copper-clad laminated plate and the like.

The polyimide resin composition of the present invention containing the conductive agent (b6) as the additive (B) has conductivity, and thus is preferably used in conductive films, fixing belts or intermediate transfer belts for various kinds of electrophotographic image forming apparatuses, electrodes or separators for cells, electromagnetic shielding materials, various kinds of electronic devises and the like.

[Composite Material]

According to the second aspect, the composite material of the present invention contains a fiber material (C) impregnated with a polyimide resin (A) containing a repeating structural unit represented by the following formula (1) and a repeating structural unit represented by the following formula (2), and the content ratio of the repeating structural unit of formula (1) with respect to the total of the repeating structural unit of formula (1) and the repeating structural unit of formula (2) is from 40 to 70 mol %:

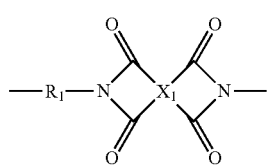
(1)

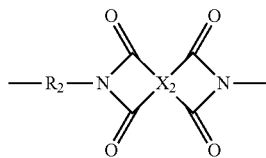
(2)

wherein $R_1$ represents a divalent group having from 6 to 22 carbon atoms containing at least one alicyclic hydrocarbon structure; $R_2$ represents a divalent chain aliphatic group having from 5 to 20 carbon atoms; and $X_1$ and $X_2$ each independently represent a tetravalent group having from 6 to 22 carbon atoms containing at least one aromatic ring.

The polyimide resin (A) used in the composite material of the present invention is the same as above.

<Fiber Material (C)>

Examples of the fiber material (C) used in the composite material of the present invention include: inorganic fibers, such as glass fiber, carbon fiber, alumina fiber, boron fiber, ceramic fiber, and metal fiber (steal fiber, etc.); and synthetic fibers, such as aramid fiber, polyoxymethylene fiber, aromatic polyamide fiber, poly-p-phenylene benzobisoxazole fiber, ultra-high molecular weight polyethylene fiber, and aromatic polyimide fiber. Among these, carbon fiber is preferably used because of having excellent features, i.e., high strength and a high modulus of elasticity in spite of its light weight. Polyacrylonitrile-based carbon fiber or pitch-based carbon fiber is preferably used as the carbon fiber.

The fiber material (C) may be in various forms, for example, monofilaments or multifilaments simply arranged in one direction or intercrossed, a fabric, such as a knit fabric, a non-woven fabric, or a mat. Among these, a monofilament, fabric, non-woven fabric, or mat form is preferred. Prepreg in which these are mounted or laminated and impregnated with a binder or the like is also preferably used.

The average fiber diameter of the fiber material (C) is preferably from 1 to 100 µm, more preferably from 3 to 50 µm, further preferably from 4 to 20 µm, and particularly preferably from 5 to 10 µm. When the average fiber diameter falls within this range, processing is easy and the resulting molded article is excellent in modulus of elasticity and strength. The average fiber diameter may be measured by observation under a scanning electron microscope (SEM) or the like. 50 or more fibers are selected at random, and their lengths are measured. A number-average fiber diameter may be calculated.

The fineness of the fiber material (C) is preferably from 20 to 3,000 tex, and more preferably from 50 to 2,000 tex. When the fineness falls within this range, processing is easy and the resulting molded article is excellent in modulus of elasticity and strength. The fineness may be determined in terms of weight per 1,000 m by determining the weights of long fibers having an arbitrary length. Carbon fiber generally having approximately from 500 to 30,000 filaments is preferably used.

The fiber length of the fiber material (C) present in the composite material of the present invention is preferably 1 cm or more, more preferably 1.5 cm or more, further preferably 2 cm or more, and particularly preferably 3 cm or more, in terms of average fiber length. The upper limit of the average fiber length differs depending on use application and is preferably 500 cm or less, more preferably 300 cm or less, and further preferably 100 cm or less.

The method for measuring the average fiber length in the composite material is not particularly limited, and the average fiber length may be determined, for example, by placing the composite material in hexafluoroisopropanol (HFIP) or concentrated sulfuric acid and measuring the lengths of fibers remaining after the dissolution of the polyimide resin. The lengths of the fibers may be measured by visual observation or in some cases, observation under an optical microscope, a scanning electron microscope (SEM) or the like. 100 fibers are selected at random, and their lengths are measured. A number-average fiber length may be calculated.

The average fiber length of a raw material before use of the fiber material used is not particularly limited and is preferably in the range of from 1 to 10,000 m, more preferably on the order of from 100 to 7,000 m, and further preferably on the order of from 1,000 to 5,000 m, in consideration of improvement in molding processability.

The fiber material (C) used in the present invention does not have to be used in the form of a chopped strand, which is as conventionally used in fiber-reinforced composite materials and is a fiber strand bundle cut into a certain length. In a more preferred embodiment of the present invention, the fiber material (C) having such a longer fiber is used. Unlike a chopped strand melt-kneaded and pelletized with a resin as conventionally frequently used, the long fiber material is used as it is, and overlaid with the polyimide resin (A) and impregnated therewith by applying heat and pressure, thereby providing a composite material. The fiber material (C) used in a long fiber state is capable of improving the modulus of elasticity and strength of the resulting molded article more than conventional molding materials using a cut fiber material, such as a chopped strand or a so-called continuous fiber. The fiber material used in a long fiber state is also capable of imparting anisotropy to the strength of the molded article, for example, improving the strength of the molded article in a particular direction. In addition, the step of producing a chopped strand may be omitted, and production cost may be reduced.

As a matter of course, however, the present invention is not intended to exclude use of the fiber material (C) in combination with a chopped fiber (D). In the case of using the fiber material (C) in combination with a chopped fiber (D), the average fiber diameter of the chopped fiber (D) is preferably shorter than that of the fiber material (C).

A fiber material having, on its surface, a functional group having affinity for or reactivity with the polyimide resin (A) is preferred for improving wettability and interface adherence with the polyimide resin (A).

Preferred examples of the fiber material having a functional group having affinity for or reactivity with the polyimide resin (A) include a fiber material surface-treated with a surface treatment agent or a sizing agent or the like.

Examples of the surface treatment agent include surface treatment agents consisting of functional compounds, such as epoxy compounds, acrylic compounds, isocyanate compounds, silane compounds, and titanate compounds. The surface treatment agent is, for example, a silane-based coupling agent or a titanate-based coupling agent, and is preferably a silane-based coupling agent.

Examples of the silane-based coupling agent include trialkoxy- or triallyloxy-silane compounds, such as aminopropyltriethoxysilane, phenylaminopropyltrimethoxysilane, glycidylpropyltriethoxysilane, methacryloxypropyltrimethoxysilane, and vinyltriethoxysilane, ureidosilane, sulfide silane, vinylsilane, and imidazolesilane.

The sizing agent is an epoxy resin, such as bisphenol A-type epoxy resin, or an epoxy acrylate resin having an acryl group or a methacryl group in one molecule. Preferred examples thereof include vinyl ester resins, such as bisphenol A-type vinyl ester resins, novolac-type vinyl ester resins, and brominated vinyl ester resins. Alternatively, the sizing agent may be an urethane-modified resin of an epoxy resin or a vinyl ester resin.

[Production of Polyimide Resin-Fiber Composite Material]

The polyimide resin (A) is overlaid with the fiber material (C).

Subsequently, the whole amount or at least a portion of the polyimide resin (A) is melted by applying heat and pressure so that the fiber material (C) layer is impregnated with the polyimide resin (A). This impregnated product is consolidated (compacted) into a composite material by applying heat and pressure.

The polyimide resin (A) may be prepared, in any form, such as a film, fibrous, powder, or pellet form, into a composite with the fiber material (C) and is preferably in a film, fibrous, or powder form, and particularly preferably in a film or fibrous form, in consideration of moldability, impregnating properties and the like.

A known method may be adopted for preparing the polyimide resin (A) in a film or fibrous form. For example, the polyimide resin (A) in this form is produced by a method, for example, fiber production by melt spinning from polyimide resin pellets, continuous film formation by the extrusion of the resin from an extruder, or film formation with a heat pressing machine.

For processing the polyimide resin (A) into a film, it is also preferred to form a film by adopting a method for embossing a film surface. Particularly, this approach is effective when the polyimide resin to be processed into a thin film tends to be broken under minor stress or unequal stress during the processing by molding. It is considered that a film having an embossed surface, i.e., a grained surface with fine surface asperities, may be prevented from being broken, because the frictional resistance between the film surface and a take-off machine, i.e., a roll or the like, may be decreased during the film formation so that the stress applied to the film is controlled uniformly to a low extent. In addition, for take-up in a roll form, the friction between film surfaces may be reduced, and the film may be taken up without being wrinkled. Also, the film may be prevented from being broken, by relaxing the stress during the take-up. When the film roll is subjected to after-processing, such as slitting into an arbitrary width or lamination with another film by dry lamination, the film is prevented from being broken, by preventing its friction with an apparatus. Thus, productivity may be improved.

The grain may be disposed only on one side or may be disposed on both sides, and is preferably disposed on both surfaces on front and back sides.

The grain refers to a grain pattern in a broad sense and includes a surface with fine asperities having difference in height, such as leather grain, pearskin finish, wood grain, grey, a wrinkle pattern, and rock eyes.

The film of the polyimide resin (A) thus obtained has a thickness of preferably from 5 to 200 µm, more preferably from 10 to 150 µm, and further preferably from 10 to 120 µm. When the thickness exceeds 200 µm, the resulting polyimide resin film has too large a thickness, which then deteriorates the impregnating properties for the fiber material (C) or increases the amount of curvature, making it difficult to obtain the composite material of interest. The lower limit thereof is preferably 5 µm, in terms of productivity.

In the case of using the polyimide resin (A) as a fibrous material, the fibrous material may be a fiber, a monofilament, a multifilament, a thread, a twist yarn, a twist yarn, a string, an oriented yarn, a rope, a material having change in denier in the longitudinal direction, a material having a roughened fiber surface, or their woven products, a yarn, a non-woven fabric or the like.

The fiber fineness of the polyimide resin (A) is preferably from 10 to 200 tex, in terms of total fineness. The total fineness is more preferably from 20 to 150 tex, and further preferably from 30 to 100 tex. The monofilament fineness is preferably from 0.1 to 3 tex, more preferably from 0.3 to 2 tex, and further preferably from 0.5 to 1 tex.

The total fineness may be determined in terms of weight per 1,000 m by measuring the weight of a multifilament having an arbitrary length. The monofilament fineness may be determined by dividing the total fineness by the number of fibers of the multifilament.

The tensile strength of the fiber is preferably from 1 to 20 gf/d, more preferably from 2 to 15 gf/d, and further preferably from 3 to 10 gf/d.

Among these, the fiber of the polyimide resin (A) is preferably a multifilament having a tensile strength of from 2 to 10 gf/d.

The tensile strength may be determined as strength per unit fineness by subjecting the multifilament to a tensile test with a tensile testing machine under conditions of 23° C. and 50% RH and dividing the maximum stress by the fineness.

When the polyimide resin (A) is in a film or fibrous form, the step of impregnating the fiber material (C) with the polyimide resin (A) is preferably performed by continuously applying pressure with plural rolls in a heated atmosphere. The continuous application of pressure is capable of pushing air contained in the fiber material (C) out of the composite material or a molded article obtained by molding this composite material, and is capable of decreasing voids in the composite material or the molded article obtained by molding this composite material.

The material of the roll is not particularly limited, and a roll with its surface coated with a fluorine resin is preferably used for preventing the adhesion of the polyimide resin (A) to the roll during the application of heat and pressure.

When the polyimide resin (A) is a powder, the powder of the polyimide resin (A) may be dispersed in the surface of the fiber material (C) and then melted by applying pressure with a roll in a heated atmosphere or by laser irradiation so that the fiber material (C) is impregnated with the polyimide resin (A).

When the aforementioned step of applying pressure adopts the step of applying pressure to the film or fiber of the polyimide resin (A) and the fiber material (C) wound around a bobbin while opening them, or adopts the step of applying pressure while unreeling the monofilament fiber material (C) wound around a bobbin, the average fiber diameter of the fiber material (C) is preferably from 1 to 100 μm, more preferably from 3 to 50 μm, further preferably from 4 to 20 μm, and particularly preferably from 5 to 10 μm.

The application of heat and pressure may be performed to two or more superimposed layers of the film or fiber of the polyimide resin (A) overlaid or laminated with the fiber material (C). In the case of such two or more superimposed layers, for example, it is desirable to superimpose at least two, and preferably five or more polyimide resin (A) film/fiber material (C) laminates such that the polyimide resin layers are positioned on both outermost sides, respectively, and to apply heat and pressure to the superimposed laminates.

The temperature for impregnating and integrating the fiber material (C) layer with the polyimide resin (A) by applying heat and pressure needs to be equal to or higher than the temperature at which the polyimide resin (A) is softened and melted. This temperature differs depending on the type or molecular weight of the polyimide resin (A) and is preferably from 340 to 400° C., and more preferably from 350 to 380° C. The application of heat and pressure in such a temperature range tends to further improve the impregnation of the fiber material (C) with the polyimide resin (A) and to improve the physical properties of the composite material or the molded article obtained by molding this composite material.

The press pressure for the application of pressure is preferably 0.1 MPa or more. The application of heat and pressure is preferably performed under reduced pressure, and in particular, in vacuum. The application of heat and pressure under such conditions is preferred because bubbles are less likely to remain in the resulting composite material.

In the case of further processing the composite material of the present invention into a molded article by heat melting, the exothermic amount of crystallization of the polyimide resin (A) in the composite material is preferably 5 J/g or more. When the exothermic amount of crystallization falls within this range, moldability is improved when the composite material is processed into a molded article. The composite material has moderate flexibility and favorable take-up performance when the composite material is taken up in a roll form and stored.

The composite material of the present invention thus produced may be solid, semisolid, or viscous and is not particularly limited by its form. Generally, the composite material of the present invention is solid or semisolid. Preferably, the composite material is capable of being taken up in a roll form and stored. Since the polyimide resin (A) is thermoplastic, the composite material may be further thermally processed into a molded article by various kinds of molding methods.

In the composite material according to the present invention, the polyimide resin (A)/fiber material (C) area ratio at the cross section is preferably from 20/80 to 80/20. The area ratio at the cross section is more preferably from 30/70 to 70/30, and further preferably from 40/60 to 60/40. When the fiber material (C) is oriented in one direction, the cross section refers to a cross section perpendicular to the longitudinal direction of the fiber material (C). When the fiber material (C) is oriented in plural directions, the cross section is defined as a surface perpendicular to the longitudinal direction of the fiber material (C) oriented in one direction arbitrarily selected from the plural directions. When the fiber material (C) is not oriented, the cross section is defined as arbitrary one direction of the composite material. The polyimide resin (A)/fiber material (C) area ratio may be determined by observing the cross section under a scanning electron microscope (SEM).

The polyimide resin may be melted off during the application of heat and pressure. Thus, the area ratio at the cross section of the composite material may not always be consistent with the area ratio calculated from the mass of the polyimide resin (A) used, the mass of the fiber material (C) used, and their densities. When the area ratio falls within the aforementioned range, the strength of the molded article is improved.

[Production of Molded Article from Composite Material]

The composite material obtained by the aforementioned method preferably has both surfaces respectively constituted by the polyimide resin (A) layers.

Since the composite material of the present invention consists of a thermoplastic resin material, this is used as a material for molding, either as it is or after being cut into a desired shape or size, and this may be preferably heated, subsequently molded, preferably, in a heated molding pattern, and removed from the pattern, thereby providing various kinds of molded articles. The molding is not limited to the method using a molding pattern and may be performed with, for example, a roll. The composite material may be preferably heated and subsequently molded by applying pressure, preferably, with a heated roll.

The heating temperature for heating the composite material at the time of molding is preferably from 300 to 400° C., and more preferably from 330 to 380° C. The pressure at the time of molding is preferably 0.1 MPa or more, more preferably 0.5 MPa or more, and further preferably 1 MPa or more. The temperature of the pattern (preferably, mold) at the time of molding is preferably from 150 to 260° C., and more preferably from 170 to 250° C.

The method for processing the composite material of the present invention into a molded article is not particularly limited, and a known technique may be applied. A compression molding method, a vacuum molding method, a vacuum compression molding method, a pressure molding method or the like may be used.

The molded article obtained by molding the composite material may be further heat-treated. The heat treatment of the molded article is capable of reducing curvature and further improving dimensional stability. The heat treatment temperature is preferably from 190 to 250° C.

In the molded article obtained by molding the composite material, the polyimide resin (A)/fiber material (C) area ratio at the cross section is preferably from 20/80 to 80/20. When the area ratio falls within this range, the strength of the molded article tends to be further improved. The area ratio at the cross section is more preferably from 30/70 to 70/30, and further preferably from 40/60 to 60/40. The polyimide resin (A)/fiber material (C) area ratio at the cross section of the molded article may be determined in the same way as in the measurement of the area ratio in the composite material.

The molded article obtained by molding the composite material is preferably compacted with decreased voids. The void area ratio at the cross section is preferably 5% or less, more preferably 3% or less, and further preferably 2% or less. The void area ratio at the cross section of the molded article may be determined in the same way as in the measurement of the void area ratio in the composite material.

The fiber length of the fiber material (C) present in the molded article obtained by molding the composite material is preferably 1 cm or more, more preferably 1.5 cm or more, further preferably 2 cm or more, and particularly preferably 3 cm or more, in terms of average fiber length. The upper limit of the average fiber length differs depending on use application and is preferably 500 cm or less, more preferably 300 cm or less, and further preferably 100 cm or less.

The method for measuring the average fiber length in the molded article is not particularly limited, and the average fiber length may be determined, for example, by placing the composite material in hexafluoroisopropanol (HFIP) or concentrated sulfuric acid and measuring the lengths of fibers remaining after the dissolution of the polyimide resin. The lengths of the fibers may be measured by visual observation or in some cases, observation under an optical microscope, a scanning electron microscope (SEM) or the like. 100 fibers are selected at random, and their lengths are measured. A number-average fiber length may be calculated.

For the use application of the molded article that particularly requires surface smoothness or high class, the resulting molded article is preferably further provided on its surface with a polyimide resin layer. Examples of the method for providing the polyimide resin layer include a method which involves laminating a polyimide resin film on the surface of the molded article and fusing them by heating, a method which involves dipping the molded article in a melted polyimide resin, and a method which involves coating the molded article with a polyimide resin powder, followed by fusion.

In the case of further providing the polyimide resin layer on the surface of the molded article, the thickness of the polyimide layer is preferably from 1 to 1,000 µm, more preferably from 3 to 500 µm, and particularly preferably from 5 to 100 µm.

The resin for use in the polyimide resin layer is preferably the polyimide resin (A).

<Other Components for Polyimide Resin (A)>

The polyimide resin (A) also preferably contains a chopped fiber (D) of the fiber material (C). The chopped fiber (D) of the fiber material (C) refers to a fiber having an average fiber length shorter than that of the fiber material (C) and preferably has an average fiber diameter smaller than that of the fiber material (C). Specifically, typical examples thereof include so-called chopped strands. Preferred examples thereof include fibers having an average fiber diameter of from 1 to 100 µm, and in particular, from 3 to 50 µm, and an average fiber length of from 0.02 to 30 mm, and in particular, from 0.1 to 20 mm. The chopped fiber (D) is preferably compounded in advance in the polyimide resin (A). The chopped fiber (D) may be of the same or different kind as or from the fiber material (C), and the same kind of the chopped fiber (D) as the fiber material (C) is preferably used.

In the case of the composite material of the present invention, the polyimide resin (A) may be further supplemented with, for example, an additive, such as an antioxidant, a stabilizer (e.g., a thermal stabilizer), a weathering stabilizer, a delusterant, a ultraviolet absorber, a nucleating agent, a plasticizer, a dispersant, a flame retardant, an antistatic agent, an anti-coloring agent, an anti-gelling agent, a colorant, or a mold release agent, without impairing the effects of the present invention.

Among those described above, a stabilizer (an antioxidant or a thermal stabilizer) is preferably mixed therewith. The stabilizer is preferably, for example, an organic stabilizer, such as a phosphorus-based, hindered phenol-based, hindered amine-based, oxalic acid anilide-based, organic sulfur-based, or aromatic secondary amine-based stabilizer, or an inorganic stabilizer, such as an amine-based antioxidant, a copper compound, or a halide. The phosphorus-based stabilizer is preferably a phosphite compound or a phosphonite compound.

In the present invention, among these stabilizers, an amine-based antioxidant or an inorganic, organic sulfur-based, or aromatic secondary amine-based stabilizer is particularly preferred, in terms of processing stability during the application of heat and pressure, heat aging resistance, film appearance, and prevention of coloring.

The content of the stabilizer is generally from 0.01 to 1 part by mass, and preferably from 0.01 to 0.8 parts by mass, with respect to 100 parts by mass of the polyimide resin (A). When the content is 0.01 parts by mass or more, the effects of improving heat discoloration and improving weather resistance or light resistance may be sufficiently exerted.

When the content is 1 part by mass or less, reduction in mechanical physical properties may be suppressed.

[Cyclic Oligoimide]

The present specification discloses a cyclic oligoimide and a method for producing the same. The cyclic oligoimide may be mixed as a resin modifier with the polyimide resin composition and the composite material of the present invention.

An aromatic polyimide resin is a useful engineering plastic that has high thermal stability, high strength and high solvent resistance. Such excellent characteristics are ascribable to rigidity, resonance stabilization and firm chemical bond of the molecular chain derived from the imide bond. The polyimide, however, is often insoluble or infusible due to its strong structural stability and often limited by its use application or shape for handling.

On the other hand, imide oligomers are limited by single use application, but solubility is easily imparted thereto, and thus, use as a heat-resistant filler or the like is expected. In JP-A-10-195195, an imide oligomer is synthesized and used as a resin additive. In National Publication of International Patent Application No. 1997-509928, large cyclic imide oligomers of interest were successfully synthesized and isolated.

However, JP-A-10-195195 has no findings about imparting of heat resistance to a resin composition after introduction.

In general, the terminal carboxylic acid or amine of a polyimide is susceptible to oxidative degradation. Since an oligoimide having a low molecular weight contains plural ends, influence on heat resistance or deterioration in hue at a high temperature is a concern.

A cyclic oligoimide, compared with a linear oligoimide, is expected to have advantages derived from the absence of ends, such as improvement in chemical stability and improvement in dispersibility when used as a filler.

Furthermore, the cyclic oligoimide also has higher thermal stability than that of general organic oligomers, because all of the bonds between monomers are achieved by imide groups. The cyclic oligomer possesses such special physical properties, and thus is expected to be used as a heat-resistant additive, a certain selective complexing material or the like.

In National Publication of International Patent Application No. 1997-509928, large cyclic imide oligomers were successfully synthesized and isolated, as already mentioned above. However, this method requires plural synthesis steps and thus, results in poor productivity. Also, reduction in physical properties, and in particular, heat resistance, caused by the amide structure contained in the cyclic form is a concern.

If the cyclic oligoimide can be obtained conveniently and selectively, a wide range of use applications is possible.

The present specification discloses a cyclic oligoimide that is capable of imparting heat resistance by mixing with various resins, and a method for producing the same, and a resin modifier consisting of the cyclic oligoimide. The present specification also discloses a method for modifying a resin, including modifying various resins by mixing the cyclic oligoimide with the resins.

The present inventors have found that the problems mentioned above can be solved by a cyclic oligoimide having a particular structure.

The cyclic oligoimide is a cyclic oligoimide represented by the following formula (5):

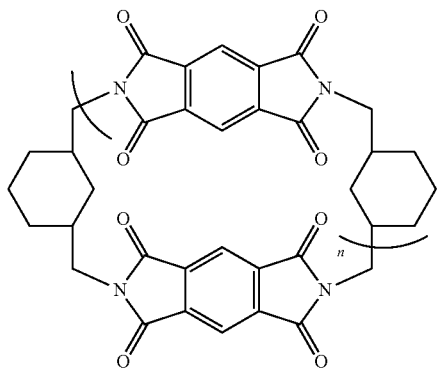

(5)

wherein n represents an integer of 1-3.

In the formula, n represents an integer of 1-3 and is preferably 1, in consideration of sufficient securing of solvent solubility for isolation and purification.

The cyclic oligoimide has an imide structure, and thus has a high decomposition temperature. In this respect, this may be used as a resin modifier, thereby improving the heat resistance of various resins.

The cyclic oligoimide may be produced by a convenient method as described below.

Specifically, pyromellitic acid and 1,3-bis(aminomethyl)cyclohexane are mixed in a polymerization solvent and reacted at from 120 to 180° C. The reaction is preferably performed under increased pressure for efficient reaction. The pressure in this reaction is preferably from normal pressure to 1.0 MPa.

The temperature for the reaction at normal pressure is preferably a relatively low temperature of from 120 to 160° C. The reaction under increased pressure is also preferably performed at a relatively low temperature of from 120 to 160° C.

A pressure-resistant apparatus or vessel that is capable of having high pressure in the inside, such as an autoclave, is preferably used for applying pressure.

After the reaction, solid matter is filtered to separate the solid matter from a filtrate. Then, a cyclic oligoimide in the solid matter is extracted from an organic solvent and purified, thereby producing a cyclic oligoimide.

The molar ratio between pyromellitic acid and 1,3-bis (aminomethyl)cyclohexane is preferably from 0.5 to 2.0, more preferably from 0.5 to 0.9 and from 1.1 to 2.0, and further preferably from 0.6 to 0.9 and from 1.1 to 1.5, in consideration of efficient obtainment of the cyclic oligoimide.

The total concentration of pyromellitic acid and 1,3-bis (aminomethyl)cyclohexane is preferably from 5 to 30 mass %, and more preferably from 5 to 20 mass %, in consideration of efficient obtainment of the cyclic oligoimide.

Preferable examples of the polymerization solvent include water, benzene, toluene, xylene, acetone, hexane, heptane, chlorobenzene, methanol, ethanol, n-propanol, isopropanol, methyl glycol, methyl triglycol, hexyl glycol, phenyl glycol, ethylene glycol, ethylene glycol monomethyl ether, ethylene glycol monoisopropyl ether, ethylene glycol monoisobutyl ether, 2-(2-methoxyethoxy)ethanol, methylpropylene glycol, methylpropylene diglycol, propylpropylene glycol, phenylpropylene glycol, 2-(2-methoxyethoxy)ethanol, N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylene sulfone, dimethylsulfoxide, o-cresol, m-cresol, p-cresol, phenol, p-chlorophenol, 2-chloro-4-hydroxytoluene, diglyme, triglyme, tetraglyme, dioxane, γ-butyrolactone, dioxolane, cyclohexanone, cyclopentanone, dichloromethane, chloroform, 1,2-dichloroethane, 1,1,2-trichloroethane, dibromomethane, tribromomethane, 1,2-dibromoethane, 1,1,2-tribromoethane, and mixtures of two or more kinds thereof. Among these, 2-(2-methoxyethoxy)ethanol is preferably used.

The charged molar ratio between pyromellitic acid and 1,3-bis(aminomethyl)cyclohexane is preferably from 0.5 to 2.0, more preferably from 0.5 to 0.9 and from 1.1 to 2.0, and further preferably from 0.6 to 0.9 and from 1.1 to 1.5 mol of 1,3-bis(aminomethyl)cyclohexane with respect to 1 mol of pyromellitic acid.

The cyclic oligoimide is preferably applicable to a resin modifier and a resin modification method which modify a resin by mixing with the resin. The method is capable of improving heat resistance (e.g., heat-resistant slidability) and suppressing reduction in color even at a high temperature when conferring white color attributed to the cyclic oligoimide.

Examples of the resin to be mixed include polyetheretherketone, polyether imide, polysulfone, polyphenylenesulfide, polyamide, polyamideimide, polyphenyleneether, polyacrylate, polyester, polycarbonate, liquid crystal polymers, and polyimides.

The cyclic oligoimide is preferably mixed in the resin at from 1 to 30 parts by mass with respect to 100 parts by mass of the resin, depending on the type of the resin.

The cyclic oligoimide is capable of improving heat resistance by mixing with various resins and as such, may be used as one of the materials for resin compositions that require high-temperature characteristics, such as members for automobiles, industrial mechanical members, and members for electric and electronic parts.

EXAMPLES

The present invention will be described in more detail with reference to examples below, but the present invention is not limited thereto. Various measurements and evaluations in each Production Example, Example, and Reference Example were carried out in the following manners.

<Logarithmic Viscosity μ>

The logarithmic viscosity μ of the polyimide resin was measured in such a manner that the resulting polyimide resin was dried at from 190 to 200° C. for 2 hours, and 0.100 g of the polyimide resin was dissolved in 20 mL of concentrated sulfuric acid (96%, produced by Kanto Chemical Co., Inc.), and measured at 30° C. with a Cannon-Fenske viscometer. The logarithmic viscosity μ was obtained according to the following expression.

$$\mu = \ln(t_s/t_0)/C$$

$t_0$: elapsed time for flowing concentrated sulfuric acid
$t_s$: elapsed time for flowing polyimide resin solution
C: 0.5 g/dL <Melting Point, Glass Transition Temperature, and Crystallization Temperature>

The melting point, the glass transition temperature and the crystallization temperature of the polyimide resin were measured with a differential scanning calorimeter ("DSC-6220", produced by SII Nanotechnology, Inc.). The polyimide resin was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point was determined by reading the peak top value of the endothermic peak observed in the first heating or the second heating. The glass transition temperature was determined by reading the value observed in the first heating or the second heating. The crystallization temperature was also determined by reading the peak top value of the exothermic peak observed in the first cooling.

In the present example, the melting point in the first heating was expressed as $Tm_0$, the melting point in the second heating was expressed as Tm, the glass transition temperature in the first heating was expressed as $Tg_0$, the glass transition temperature in the second heating was expressed as Tg, the crystallization temperature in the first heating was expressed as $Tc_0$, and the crystallization temperature in the first cooling was expressed as Tc.

<Crystallization Half-Time>

The crystallization half-time of the polyimide resin was measured with a differential scanning calorimeter ("DSC-6220", produced by SII Nanotechnology, Inc.).

A polyimide resin having a crystallization half-time of 20 seconds or less was measured under such conditions that in a nitrogen atmosphere, the polyimide resin was held at 420° C. for 10 minutes for melting the polyimide resin completely, and then quenched at a cooling rate of 70° C./min, during which the time required from the appearance of the crystallization peak observed to the peak top thereof was calculated for determining the crystallization half-time.

<Infrared Spectroscopy (IR Measurement)>

The IR measurement of the polyimide resin or the cyclic oligoimide was performed with "JIR-WINSPEC 50", produced by JEOL, Ltd.

<1% Decomposition Temperature>

The 1% decomposition temperature of the polyimide resin or the cyclic oligoimide was measured with a thermogravimetry/differential thermal analyzer ("TG/DTA-6200", produced by SII Nanotechnology, Inc.). Such a temperature that a weight loss of 1% with respect to the initial weight occurred on measuring at a heating rate of 10° C./min in the air atmosphere was defined as the 1% decomposition temperature.

<FD-MS Measurement>

The molecular weight of the cyclic oligoimide was measured with "JMS-700", produced by JEOL, Ltd. For the measurement, the cyclic oligoimide was dissolved in chloroform and measured as a dilute solution.

<Mechanical Strength>

The polyimide resins and the molded articles of polyimide resin compositions prepared in Example 1-1 and Reference Example 1-1 were used as test specimens. JIS K7139 type A test specimens and test specimens of 80×10×4 mm thick cut out of JIS K7139 type A test specimens were used in the tensile test and the bending test, respectively. The bending test and the tensile test were conducted with a bending testing machine ("Bend Graph II", produced by Toyo Seiki Kogyo Co., Ltd.) and a tensile testing machine ("Strograph AP III", produced by Toyo Seiki Kogyo Co., Ltd.), respectively, thereby measuring bending strength, flexural modulus, tensile strength, and tensile modulus. The bending test was conducted according to JIS K7171, and the tensile test was conducted according to JIS K7113.

<Oxygen Index>

In Examples 2-1 and 2-2 and Reference Example 2-1, the oxygen index was measured with a test specimen of 80 mm×10 mm×4 mm thick according to the method of JIS K7201-2. The measurement apparatus was Candle Type Flammability Tester, Model D (produced by Toyo Seiki Seisaku-Sho, Ltd.).

<Lab Value and YI Value (Hue Evaluation)>

In Reference Examples 3-1 to 3-4 and Examples 3-1 to 3-4, 3-6, and 3-7, pellets having a length of from 3 to 4 mm and a diameter of from 0.7 to 1.2 mm were prepared. The pellets were dried at 190° C. for 10 hours, and the Lab value and the YI value were measured by a reflection method with a differential colorimeter ("ZE2000", produced by Nippon Denshoku Kogyo Industries Co., Ltd.).

L represents lightness, and a larger value means a higher degree of whiteness. a represents the degree of red-green, and a larger value means stronger redness while a smaller value means stronger greenishness. b represents the degree of yellow-blue, and a larger value means stronger yellowishness while a smaller value means stronger bluishness. YI represents the yellow index, and a smaller value means weaker yellowishness and a better hue.

<Total Light Transmittance>

The pellets obtained in Example 3-5 were subjected to heat press molding with a vacuum pressing apparatus (produced by Kodaira Seisakusho Co., Ltd.) at a pressing machine temperature of 350° C. and a press pressure of 5 kN for a press time of 30 seconds, thereby preparing a film having a thickness of 97 μm. The total light transmittance of this film was measured with a differential colorimeter ("ZE2000", produced by Nippon Denshoku Kogyo Industries Co., Ltd.).

<Surface Roughness>

The surface roughness (arithmetic mean roughness: Ra) was measured with a laser microscope (VK-X210), produced by Keyence Corporation. The film prepared in each of Examples 4-1 and 4-2 and Reference Example 4-1 was measured two times each for the upper and lower sides, and an average value from a total of 4 measurements was determined.

In Examples 4-1 and 4-2 and Reference Example 4-1 below, if prepared films had the same level of Ra, a lower coefficient of static friction measured by the following method means higher slidability.

<Coefficient of Static Friction>

The coefficient of static friction was measured with a portable tribometer ("3D Muse" TYPE: 37, produced by Shinto Scientific Co., Ltd.). Two films prepared in each of Examples 4-1 and 4-2 and Reference Example 4-1 were measured three times each for the upper and lower sides, and an average value from a total of 12 measurements was determined.

<YI Value (Evaluation of Heat Aging Resistance)>

In Examples 5-1 and 5-2 and Reference Example 5-1, pellets having a length of from 3 to 4 mm and a diameter of from 0.7 to 1.2 mm were prepared. The pellets were dried at 190° C. for 10 hours, and the YI value was measured by a reflection method with a differential colorimeter ("ZE2000", produced by Nippon Denshoku Kogyo Industries Co., Ltd.).

YI represents the yellow index, and a smaller YI value means that coloring associated with oxidative degradation caused by heating was suppressed and heat aging resistance was excellent.

[Production Example 1] Production of Polyimide Resin 1

650 g of 2-(2-methoxyethoxy)ethanol (produced by Nippon Nyukazai Co., Ltd.) and 257.75 g (1.180 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 83.96 g (0.5902 mol) of 1,3-bis(aminomethyl)cyclohexane (produced by Mitsubishi Gas Chemical Co., Inc.), 54.86 g (0.4722 mol) of 1,6-hexamethylenediamine (produced by Wako Pure Chemical Industries, Ltd.), and 23.64 g (0.1180 mol) of 4,4'-diaminodiphenyl ether (produced by Wakayama Seika Kogyo Co., Ltd.) were dissolved in 250 g of 2-(2-methoxyethoxy)ethanol with a 500 mL beaker, thereby preparing a mixed diamine solution. This mixed diamine solution was gradually added thereto with a plunger pump. This dropwise addition of the mixed diamine solution was carried out in a nitrogen flow state over the whole period. The number of rotations of the agitation blade was set to 250 rpm. After the completion of the dropwise addition, 100 g of 2-(2-methoxyethoxy)ethanol and 1.897 g (0.0177 mol) of benzylamine (produced by Kanto Chemical Co., Inc.) were added thereto, and the mixture was further agitated. At this stage, a yellow clear homogenous polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 130 to 150° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 190° C. for 10 hours with a drier, thereby providing 360 g of a powder of polyimide resin 1.

The measurement with DSC revealed that only $Tm_0$ was observed at 338° C. in the first heating, but $Tg_0$ and $Tc_0$ were not clearly observed (i.e., which meant that the polyimide resin had high crystallinity). In the cooling, Tc was observed at 308° C. (exothermic amount: 12.0 mJ/mg), which confirmed that the polyimide resin had high crystallinity. In the second heating, Tg was observed at 226° C., and Tm was observed at 335° C. Furthermore, the crystallization half-time measured was 20 seconds or less. The 1% decomposition temperature was 411° C., and the logarithmic viscosity was 0.63 dL/g. The measurement of the IR spectrum showed the characteristic absorption of an imide ring $v(C=O)$ observed at 1,771 and 1,699 $(cm^{-1})$.

[Production Example 2] Production of Polyimide Resin 2

650 g of 2-(2-methoxyethoxy)ethanol (produced by Nippon Nyukazai Co., Ltd.) and 260.97 g (1.197 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 100.94 g (0.7096 mol) of 1,3-bis(aminomethyl)cyclohexane (produced by Mitsubishi Gas Chemical Co., Inc.) and 54.96 g (0.4730 mol) of 1,6-hexamethylenediamine (produced by Wako Pure Chemical Industries, Ltd.) were dissolved in 250 g of 2-(2-methoxyethoxy)ethanol with a 500 mL beaker, thereby preparing a mixed diamine solution. This mixed diamine solution was gradually added thereto with a plunger pump. This dropwise addition of the mixed diamine solution was carried out in a nitrogen flow state over the whole period. The number of rotations of the agitation blade was set to 250 rpm. After the completion of the dropwise addition, 100 g of 2-(2-methoxyethoxy)ethanol and 3.17 g (0.0296 mol) of benzylamine (produced by Kanto Chemical Co., Inc.) were added thereto, and the mixture was further agitated. At this stage, a yellow clear homogenous polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 130 to 150° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 190° C. for 10 hours with a drier, thereby providing 360 g of a white powder of polyimide resin 2.

The measurement with DSC revealed that only $Tm_0$ was observed at 342° C. in the first heating, but $Tg_0$ and $Tc_0$ were not clearly observed (i.e., which meant that the polyimide resin had high crystallinity). In the cooling, Tc was observed at 294° C. (exothermic amount: 11.6 mJ/mg), which confirmed that the polyimide resin had high crystallinity. In the second heating, Tg was observed at 224° C., and Tm was observed at 341° C. Furthermore, the crystallization half-time measured was 20 seconds or less. The logarithmic viscosity was 0.69 dL/g. The measurement of the IR spectrum showed the characteristic absorption of an imide ring $v(C=O)$ observed at 1,771 and 1,699 $(cm^{-1})$.

[Production Example 3] Production of Polyimide Resin 3

650 g of 2-(2-methoxyethoxy)ethanol (produced by Nippon Nyukazai Co., Ltd.) and 163.59 g (0.750 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 42.36 g (0.2978 mol) of 1,3-bis(aminomethyl)cyclohexane (produced by Mitsubishi Gas Chemical Co., Inc.) and 76.967 g (0.4467 mol) of 1,10-decamethylenediamine (produced by Kokura Synthetic Industries, Ltd.) were dissolved in 250 g of 2-(2-methoxyethoxy)ethanol with a 500 mL beaker, thereby preparing a mixed diamine solution. This mixed diamine solution was gradually added thereto with a plunger pump. This dropwise addition of the mixed diamine solution was carried out in a nitrogen flow state over the whole period. The number of rotations of the agitation blade was set to 250 rpm. After the completion of the dropwise addition, 100 g of 2-(2-methoxyethoxy)ethanol and 1.19 g (0.0112 mol) of benzylamine (produced by Kanto Chemical Co., Inc.) were added thereto, and the mixture was further agitated. At this stage, a yellow clear homogenous polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 130 to 150° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 190° C. for 10 hours with a drier, thereby providing 247 g of a white powder of polyimide resin 3.

The measurement of the polyimide resin 3 with DSC revealed that only Tg and $Tm_0$ were observed at 184° C. and 272° C., respectively, in the first heating, but $Tc_0$ was not clearly observed (which meant that the polyimide resin had high crystallinity). In the cooling, Tc was observed at 225° C. (exothermic amount: 17.7 mJ/mg), which confirmed that the polyimide resin had high crystallinity. In the second heating, Tg was observed at 187° C., and Tm was observed at 267 and 277° C. Furthermore, the crystallization half-time measured was 20 seconds or less. The logarithmic viscosity was 0.71 dL/g. The measurement of the IR spectrum showed the characteristic absorption of an imide ring $v(C=O)$ observed at 1,771 and 1,699 $(cm^{-1})$.

[Production Example 4] Production of Polyimide Resin 4

650 g of 2-(2-methoxyethoxy)ethanol (produced by Nippon Nyukazai Co., Ltd.) and 163.59 g (0.750 mol) of pyromellitic dianhydride (produced by Mitsubishi Gas Chemical Co., Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 42.36 g (0.2978 mol) of 1,3-bis(aminomethyl)cyclohexane (produced by Mitsubishi Gas Chemical Co., Inc.) and 89.50 g (0.4467 mol) of 1,12-dodecamethylenediamine (produced by Tokyo Chemical Industry Co., Ltd.) were dissolved in 250 g of 2-(2-methoxyethoxy)ethanol with a 500 mL beaker, thereby preparing a mixed diamine solution. This mixed diamine solution was gradually added thereto with a plunger pump. This dropwise addition of the mixed diamine solution was carried out in a nitrogen flow state over the whole period. The number of rotations of the agitation blade was set to 250 rpm. After the completion of the dropwise addition, 100 g of 2-(2-methoxyethoxy)ethanol and 1.19 g (0.0112 mol) of benzylamine (produced by Kanto Chemical Co., Inc.) were added thereto, and the mixture was further agitated. At this stage, a yellow clear homogenous polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 130 to 150° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 190° C. for 10 hours with a drier, thereby providing 260 g of a white powder of polyimide resin 4.

The measurement with DSC revealed that only $Tm_0$ was observed at 249° C. in the first heating, but $Tg_0$ and $Tc_0$ were not clearly observed (i.e., which meant that the polyimide resin had high crystallinity). In the cooling, Tc was observed at 212° C. (exothermic amount: 22.8 mJ/mg), which confirmed that the polyimide resin had high crystallinity. In the second heating, Tg was observed at 173° C., and Tm was observed at 253° C. Furthermore, the crystallization half-time measured was 20 seconds or less. The logarithmic viscosity was 0.73 dL/g. The measurement of the IR spectrum showed the characteristic absorption of an imide ring v(C=O) observed at 1,771 and 1,699 (cm$^{-1}$).

Example 1-1 and Reference Example 1-1: Resin Composition Containing Filler (b1)

Example 1-1

10.7 g of talc ("MICRON WHITE #5000S", produced by Hayashi-Kasei Co., Ltd., average particle size: 2.8 μm) as filler 1 was added to 4000 g of the powder of polyimide resin 1 obtained in Production Example 1, and sufficiently mixed therewith by dry blend. The resulting mixed powder was extruded at a barrel temperature of 350° C. and a screw rotation speed of 254 rpm with a co-rotating twin-screw extruder ("TEM37BS", produced by Toshiba Machine Co., Ltd.). In this operation, glass fiber ("T-275H", produced by Nippon Electric Glass Co., Ltd., diameter: 10.5 fiber length: 3 mm) was introduced as filler 2 in the extruder with a side feeder, mixed during melting, and extruded. The glass fiber was introduced at 25 mass % with respect to the whole amount of the polyimide resin composition.

A strand extruded from the extruder was cooled in water and then pelletized with a pelletizer ("SCF-150", produced by Isuzu Kakoki Co., Ltd.). The resulting pellets were dried at 190° C. for 10 hours and then used in injection molding. The 1% decomposition temperature of the dried pellets was 447° C. The injection molding was performed at a barrel temperature of 355° C., a mold temperature of 210° C., and a molding cycle of 60 seconds with an injection molding machine ("ROBOSHOT α-S50iA", produced by Fanuc Corporation), thereby preparing a molded article (JIS K7139 type A). This molded article was used as a test specimen and subjected to the bending test and the tensile test by the methods mentioned above. The results are shown in Table 1.

Reference Example 1-1

The powder of polyimide resin 1 obtained in Production Example 1 was extruded at a barrel temperature of 350° C. and a screw rotation speed of 254 rpm with a co-rotating twin-screw extruder ("TEM37BS", produced by Toshiba Machine Co., Ltd.). A strand extruded from the extruder was cooled in water and then pelletized with a pelletizer ("SCF-150", produced by Isuzu Kakoki Co., Ltd.). The resulting pellets were dried at 190° C. for 10 hours and then used in injection molding. The 1% decomposition temperature of the dried pellets was 430° C. The injection molding was performed by a method and conditions similar to those of Example 1-1, thereby preparing a test specimen, which was subjected to the bending test and the tensile test. The results are shown in Table 1.

TABLE 1

|  |  | Example 1-1 | Reference Example 1-1 |
|---|---|---|---|
| Polyimide resin (A) (mass %) | Polyimide resin 1 | 74.8 | 100 |
| Filler (b1) (mass %) | Glass fiber | 25 | — |
|  | Talc | 0.2 | — |
| Evaluation results | Bending strength (MPa) | 241 | 123 |
|  | Flexural modulus (GPa) | 10.9 | 2.8 |
|  | Tensile strength (MPa) | 155 | 74 |
|  | Tensile modulus (GPa) | 11.6 | 2.7 |

Examples 2-1 and 2-2 and Reference Example 2-1: Resin Composition Containing Flame Retardant (b2)

Example 2-1

60 g of zinc stannate ("Flamtard S", produced by Nippon Light Metal Co., Ltd.) as a metal oxide-based flame retardant was added to 540 g of the powder of polyimide resin 1 obtained in Production Example 1, and sufficiently mixed therewith by dry blend. The resulting mixed powder was extruded at a barrel temperature of 350° C. and a screw rotation speed of 70 rpm with Labo Plasto Mill (produced by Toyo Seiki Seisaku-Sho, Ltd.). A strand extruded from the extruder was cooled in air and then pelletized with a pelletizer ("Fan Cutter FC-Mini-4/N", produced by Hoshi Plastic Co., Ltd.). The resulting pellets were dried at 190° C. for 10 hours and then used in injection molding. The injection molding was performed at a barrel temperature of 360° C. and a mold temperature of 170° C. with an injection molding machine ("HAAKE MiniJet II", produced by Thermo Fisher Scientific K.K.), thereby preparing a molded article (80 mm×10 mm×4 mm thick). This molded article was used as a test specimen and subjected to the oxygen index measurement by the method mentioned above. The oxygen index was 30.4.

Example 2-2

A molded article was prepared in the same way as in Example 2-1 except that 60 g of an aromatic condensed phosphoric acid ester-based flame retardant ("PX-202", produced by Daihachi Chemical Industry Co., Ltd.) was used instead of Flamtard S of Example 2-1. This molded article was used as a test specimen and subjected to the oxygen index measurement by the method mentioned above. The oxygen index was 29.7.

Reference Example 2-1

A molded article was prepared in the same way as in Example 2-1 except that the flame retardant was not added. This molded article was used as a test specimen and subjected to the oxygen index measurement by the method mentioned above. The oxygen index was 26.2.

Reference Examples 3-1 to 3-4 and Examples 3-1 to 3-7: Resin Composition Containing Colorant (b3)

Reference Example 3-1

The powder of polyimide resin 1 obtained in Production Example 1 was extruded at a barrel temperature of 350° C. and a screw rotation speed of 30 rpm with Labo Plasto Mill μ (produced by Toyo Seiki Seisaku-Sho, Ltd.).

A strand extruded from the extruder was cooled in air and then pelletized with a pelletizer ("Fan Cutter FC-Mini-4/N", produced by Hoshi Plastic Co., Ltd.). The resulting pellets had brown translucent appearance. Lab and YI of the pellets were measured by the methods mentioned above. The results are shown in Table 2.

Reference Example 3-2

The powder of polyimide resin 2 obtained in Production Example 2 was extruded at a barrel temperature of 350° C. and a screw rotation speed of 30 rpm with Labo Plasto Mill μ (produced by Toyo Seiki Seisaku-Sho, Ltd.). A strand extruded from the extruder was cooled in air, and pellets were prepared in the same way as in Reference Example 3-1. The resulting pellets had light brown translucent appearance. Lab and YI of the pellets were measured by the methods mentioned above. The results are shown in Table 2.

Reference Example 3-3

The powder of polyimide resin 3 obtained in Production Example 3 was extruded at a barrel temperature of 310° C. and a screw rotation speed of 30 rpm with Labo Plasto Mill μ (produced by Toyo Seiki Seisaku-Sho, Ltd.). A strand extruded from the extruder was cooled in air, and pellets were prepared in the same way as in Reference Example 3-1. The resulting pellets had light brown opaque appearance. Lab and YI of the pellets were measured by the methods mentioned above. The results are shown in Table 2.

Reference Example 3-4

The powder of polyimide resin 4 obtained in Production Example 4 was extruded at a barrel temperature of 300° C. and a screw rotation speed of 30 rpm with Labo Plasto Mill μ (produced by Toyo Seiki Seisaku-Sho, Ltd.). A strand extruded from the extruder was cooled in air, and pellets were prepared in the same way as in Reference Example 3-1. The resulting pellets had slightly brown opaque appearance. Lab and YI of the pellets were measured by the methods mentioned above. The results are shown in Table 2.

Example 3-1

2 g of an anthraquinone-based green organic dye ("Diaresin Green C", produced by Mitsubishi Chemical Corporation) as a colorant was added to 198 g of the powder of polyimide resin 1 obtained in Production Example 1, and sufficiently mixed therewith by dry blend. The resulting mixed powder was extruded at a barrel temperature of 350° C. and a screw rotation speed of 30 rpm with Labo Plasto Mill μ (produced by Toyo Seiki Seisaku-Sho, Ltd.).

A strand extruded from the extruder was cooled in air, and pellets were prepared in the same way as in Reference Example 3-1. The resulting pellets had deep green appearance. Lab and YI of the pellets were measured by the methods mentioned above. The results are shown in Table 2. The a, b, and YI values were confirmed to be remarkably decreased as compared with Reference Example 3-1.

Example 3-2

Pellets were prepared in the same way as in Example 3-1 except that the colorant of Example 3-1 was changed to 2 g of an anthraquinone-based blue organic dye ("Diaresin Blue N", produced by Mitsubishi Chemical Corporation). The resulting pellets had deep blue appearance. Lab and YI of the pellets were measured by the methods mentioned above. The results are shown in Table 2. The a, b, and YI values were confirmed to be remarkably decreased as compared with Reference Example 3-1.

Example 3-3

60 g of titanium oxide ("CR-60", produced by Ishihara Sangyo Kaisha, Ltd.) as a white inorganic pigment was added to 240 g of the powder of polyimide resin 1 obtained in Production Example 1, and sufficiently mixed therewith by dry blend. The resulting mixed powder was extruded at a barrel temperature of 360° C. and a screw rotation speed of 30 rpm with Labo Plasto Mill μ (produced by Toyo Seiki Seisaku-Sho, Ltd.).

A strand extruded from the extruder was cooled in air, and pellets were prepared in the same way as in Reference Example 3-1. The resulting pellets had milky white appearance. Lab and YI of the pellets were measured by the methods mentioned above. The results are shown in Table 2. The L value was increased, and the YI value was decreased, as compared with Reference Example 3-1, confirming that the degree of whiteness (lightness) was improved with reduced yellowishness.

Example 3-4

60 g of titanium oxide ("CR-60", produced by Ishihara Sangyo Kaisha, Ltd.) as a white inorganic pigment was added to 240 g of the powder of polyimide resin 2 obtained in Production Example 2, and sufficiently mixed therewith by dry blend. The resulting mixed powder was extruded at a barrel temperature of 360° C. and a screw rotation speed of 30 rpm with Labo Plasto Mill μ (produced by Toyo Seiki Seisaku-Sho, Ltd.).

A strand extruded from the extruder was cooled in air, and pellets were prepared in the same way as in Reference Example 3-1. The resulting pellets had white appearance. Lab and YI of the pellets were measured by the methods mentioned above. The results are shown in Table 2. The L value was increased, and the YI value was decreased, as compared with Reference Example 3-2, confirming that the degree of whiteness (lightness) was improved with reduced yellowishness.

Example 3-5

30 g of flake graphite ("BF-10AK", produced by Chuetsu Graphite Works Co., Ltd.) was added to 270 g of the powder of polyimide resin 2 obtained in Production Example 2, and sufficiently mixed therewith by dry blend. The resulting mixed powder was extruded at a barrel temperature of 360° C. and a screw rotation speed of 30 rpm with Labo Plasto Mill μ (produced by Toyo Seiki Seisaku-Sho, Ltd.).

A strand extruded from the extruder was cooled in air, and pellets were prepared in the same way as in Reference Example 3-1. The resulting pellets had black appearance.

A film having a thickness of 97 μm was prepared by the method mentioned above. The resulting film had black appearance. The total light transmittance of this film was measured and was consequently 0%, confirming that the film was completely shielded from transmitted light.

Example 3-6

2 g of an anthraquinone-based green organic dye ("Diaresin Green C", produced by Mitsubishi Chemical Corporation) as a colorant was added to 198 g of the powder of polyimide resin 3 obtained in Production Example 3, and sufficiently mixed therewith by dry blend. The resulting mixed powder was extruded at a barrel temperature of 310° C. and a screw rotation speed of 30 rpm with Labo Plasto Mill μ (produced by Toyo Seiki Seisaku-Sho, Ltd.).

A strand extruded from the extruder was cooled in air, and pellets were prepared in the same way as in Reference Example 3-1. The resulting pellets had deep green appearance. Lab and YI of the pellets were measured by the methods mentioned above. The results are shown in Table 2.

The a, b, and YI values were confirmed to be remarkably decreased as compared with Reference Example 3-3.

Example 3-7

2 g of an anthraquinone-based green organic dye ("Diaresin Green C", produced by Mitsubishi Chemical Corporation) as a colorant was added to 198 g of the powder of polyimide resin 4 obtained in Production Example 4, and sufficiently mixed therewith by dry blend. The resulting mixed powder was extruded at a barrel temperature of 300° C. and a screw rotation speed of 30 rpm with Labo Plasto Mill μ (produced by Toyo Seiki Seisaku-Sho, Ltd.).

A strand extruded from the extruder was cooled in air, and pellets were prepared in the same way as in Reference Example 3-1. The resulting pellets had deep green appearance. Lab and YI of the pellets were measured by the methods mentioned above. The results are shown in Table 2. The a, b, and YI values were confirmed to be remarkably decreased as compared with Reference Example 3-4.

(produced by Kodaira Seisakusho Co., Ltd.) at a pressing machine temperature of 345° C. and a press pressure of 5 kN for a press time of 30 seconds. For this press, aluminum plates of 25 cm×25 cm×0.5 mm thick were placed above and below the pressing machine in order to facilitate delivery after the molding. After cooling, the fluorine resin-impregnated glass cloths were removed, thereby providing a film having a thickness of 110 μm. The resulting film had surface roughness (Ra) of 6.01 μm and a coefficient of static friction of 0.191.

Example 4-2

A film having a thickness of 102 μm was prepared in the same way as in Example 4-1 except that the amount of the powder of polyimide resin 1 of Example 4-1 was changed to 480 g and the slidability-improving agent of Example 4-1 was changed to 120 g of a PTFE-based lubricant ("KTL-

TABLE 2

|  |  | Reference Example 3-1 | Reference Example 3-2 | Reference Example 3-3 | Reference Example 3-4 | Example 3-1 | Example 3-2 | Example 3-3 | Example 3-4 | Example 3-6 | Example 3-7 |
|---|---|---|---|---|---|---|---|---|---|---|---|
| Polyimide resin (A) (mass %) | Polyimide resin 1 | 100 |  |  |  | 99 | 99 | 80 |  |  |  |
|  | Polyimide resin 2 |  | 100 |  |  |  |  |  | 80 |  |  |
|  | Polyimide resin 3 |  |  | 100 |  |  |  |  |  | 99 |  |
|  | Polyimide resin 4 |  |  |  | 100 |  |  |  |  |  | 99 |
| Colorant (b3) (mass %) | Green dye |  |  |  |  | 1 |  |  |  | 1 | 1 |
|  | Blue dye |  |  |  |  |  | 1 |  |  |  |  |
|  | Titanium oxide |  |  |  |  |  |  | 20 | 20 |  |  |
| Evaluation results | L | 22.11 | 24.05 | 33.97 | 49.40 | 16.71 | 18.47 | 65.56 | 73.17 | 15.86 | 15.68 |
|  | a | 9.86 | 7.16 | 7.30 | 7.83 | −1.16 | −0.18 | 2.19 | 2.15 | −1.24 | −1.75 |
|  | b | 6.38 | 7.60 | 12.60 | 18.34 | −0.55 | 0.97 | 19.23 | 12.36 | −1.13 | −0.57 |
|  | YI | 83.89 | 78.10 | 82.03 | 78.04 | −10.66 | 8.96 | 55.11 | 32.56 | −18.16 | −14.29 |

Examples 4-1 and 4-2 and Reference Example 4-1: Resin Composition Containing Slidability-Improving Agent (b4)

Example 4-1

60 g of a PTFE-based lubricant ("KT-300M", produced by Kitamura Ltd.) as a slidability-improving agent was added to 540 g of the powder of polyimide resin 1 obtained in Production Example 1, and sufficiently mixed therewith by dry blend. The resulting mixed powder was extruded at a barrel temperature of 350° C. and a screw rotation speed of 70 rpm with Labo Plasto Mill (produced by Toyo Seiki Seisaku-Sho, Ltd.).

A strand extruded from the extruder was cooled in air and then pelletized with a pelletizer ("Fan Cutter FC-Mini-4/N", produced by Hoshi Plastic Co., Ltd.). The resulting pellets were dried at 190° C. for 10 hours and then used in heat press molding.

A fluorine resin-impregnated glass cloth of 25 cm×25 cm×0.115 mm thick ("FGF-400-6", produced by Chukoh Chemical Industries, Ltd.) was covered with the pellets such that the pellets did not overlap with each other. A fluorine resin-impregnated glass cloth of 25 cm×25 cm×0.115 mm thick was further placed on the pellets. This was subjected to heat press molding with a vacuum pressing apparatus 610", produced by Kitamura Ltd.). The film had surface roughness (Ra) of 6.36 μm and a coefficient of static friction of 0.183.

Reference Example 4-1

The powder of polyimide resin 1 obtained in Production Example 1 was extruded at a barrel temperature of 350° C. and a screw rotation speed of 70 rpm with Labo Plasto Mill (produced by Toyo Seiki Seisaku-Sho, Ltd.). A strand extruded from the extruder was cooled in air, and a film having a thickness of 97 μm was prepared in the same way as in Example 4-1. The film had surface roughness (Ra) of 6.26 μm and a coefficient of static friction of 0.204.

Examples 5-1 and 5-2 and Reference Example 5-1: Resin Composition Containing Antioxidant (b5)

Example 5-1

2.5 g of a hindered phenol-based antioxidant ("Irganox 1010", produced by BASF Japan Ltd.) and 2.5 g of pentaerythritol tetrakis(3-laurylthiopropionate) ("SUMILIZER TP-D", produced by Sumitomo Chemical Co., Ltd.) as a sulfur-based antioxidant were added to 495 g of the powder of polyimide resin 1 obtained in Production Example 1, and sufficiently mixed therewith by dry blend. The resulting mixed powder was extruded at a barrel temperature of 350° C. and a screw rotation speed of 30 rpm with Labo Plasto Mill μ (produced by Toyo Seiki Seisaku-Sho, Ltd.). A strand extruded from the extruder was cooled in air and then pelletized with a pelletizer ("Fan Cutter FC-Mini-4/N", produced by Hoshi Plastic Co., Ltd.). The resulting pellets were dried at 190° C. for 10 hours, and the YI value was measured by the method mentioned above and consequently was 66.26. The YI value was decreased as compared with the case where the antioxidant was not introduced (Reference Example 5-1), confirming that oxidative degradation caused by heating was suppressed.

Example 5-2

Pellets were prepared in the same way as in Example 5-1 except that 2.5 g of a hindered phenol-based antioxidant ("Irganox 1098", produced by BASF Japan Ltd.) was used instead of 2.5 g of a hindered phenol-based antioxidant ("Irganox 1010", produced by BASF Japan Ltd.) as the antioxidant of Example 5-1. The YI value was measured by the method mentioned above. The YI value was 67.98.

Reference Example 5-1

Pellets were prepared in the same way as in Example 5-1 except that the antioxidant was not added. The YI value was measured by the method mentioned above. The YI value was 83.89.

Examples 6-1 and 6-2 and Reference Examples 6-1 and 6-2: Composite Material

Example 6-1

The powder of polyimide resin 1 obtained in Production Example 1 was extruded at a barrel temperature of 350° C. and a screw rotation speed of 70 rpm with Labo Plasto Mill (produced by Toyo Seiki Seisaku-Sho, Ltd.). A strand extruded from the extruder was cooled in air and then pelletized with a pelletizer ("Fan Cutter FC-Mini-4/N", produced by Hoshi Plastic Co., Ltd.).

A fluorine resin-impregnated glass cloth of 25 cm×25 cm×0.115 mm thick ("FGF-400-6", produced by Chukoh Chemical Industries, Ltd.) was covered with the pellets such that the pellets did not overlap with each other. A fluorine resin-impregnated glass cloth of 25 cm×25 cm×0.115 mm thick was further placed on the pellets. This was subjected to heat press molding with a vacuum pressing apparatus (produced by Kodaira Seisakusho Co., Ltd.) at a pressing machine temperature of 350° C. and a press pressure of 5 kN for a press time of 30 seconds. For this press, aluminum plates of 25 cm×25 cm×0.5 mm thick were placed above and below the pressing machine in order to facilitate delivery after the molding. After cooling, the fluorine resin-impregnated glass cloths were removed, thereby providing a film having a thickness of 108 μm. Another film having a thickness of 102 μm was further obtained by similar operation.

Subsequently, a fluorine resin-impregnated glass cloth of 25 cm×25 cm×0.115 mm thick (produced by Chukoh Chemical Industries, Ltd.) was covered with the film. A 20 cm×20 cm cut piece of a carbon fiber spread tow fabric ("BUS-070G24WH", produced by Sakai Ovex Co., Ltd.) was placed on the film. The resulting carbon fiber spread tow fabric was covered with the film Finally, a fluorine resin-impregnated glass cloth of 25 cm×25 cm×0.115 mm thick was placed on the top. At this stage, a laminate of "fluorine resin-impregnated glass cloth-resin film-carbon fiber spread tow fabric-resin film-fluorine resin-impregnated glass cloth" in this order was obtained. This laminate was subjected to heat press molding with a vacuum pressing apparatus at a pressing machine temperature of 350° C. and a press pressure of 10 kN for a press time of 40 seconds, and cooled, and the fluorine resin-impregnated glass cloths were removed, thereby providing a plate-like composite material having the polyimide resin 1 on both surfaces.

The resulting composite material was cut into a shape of 1 cm×15 cm. In this operation, the composite material was cut such that the warp and woof of the carbon fiber spread tow fabric intersected the long side and short side, respectively, of the test specimen. The tensile strength and tensile modulus of the resulting test specimen were measured by the method of JIS K7127. The measurement was performed with a tensile testing machine ("Strograph EII", produced by Toyo Seiki Seisaku-Sho, Ltd.). The tensile strength was 127 MPa, and the tensile modulus was 15.2 GPa.

Example 6-2

The powder of polyimide resin 2 obtained in Production Example 2 was pelletized, made into a film, and prepared into a composite with a carbon fiber spread tow fabric in the same way as in Example 6-1. The resulting composite material was subjected to the tensile test in the same way as in Example 6-1. The tensile strength was 119 MPa, and the tensile modulus was 13.1 GPa.

Reference Example 6-1

The powder of polyimide resin 1 obtained in Production Example 1 was pelletized and made into a film in the same way as in Example 6-1. The resulting film of the polyimide resin 1 was subjected to the tensile test in the same way as in Example 6-1. The tensile strength was 65 MPa, and the tensile modulus was 2.5 GPa.

Reference Example 6-2

The polyimide resin 2 was pelletized and made into a film in the same way as in Reference Example 6-1 except that the polyimide resin 1 was changed to the polyimide resin 2.

The resulting film of the polyimide resin 2 was subjected to the tensile test in the same way as in Example 6-1. The tensile strength was 62 MPa, and the tensile modulus was 2.5 GPa.

[Production Example 5] Production of Cyclic Oligoimide 100 g of 2-(2-methoxyethoxy)ethanol (produced by Nippon Nyukazai Co., Ltd.), 10.0 g (0.0393 mol) of pyromellitic acid (produced by Mitsubishi Gas Chemical Co., Inc.), and 3.91 g (0.02751 mol) of 1,3-bis(aminomethyl)cyclohexane (produced by Mitsubishi Gas Chemical Co., Inc.) were introduced in a 200 mL autoclave equipped with a thermocouple and a four-paddle blade. After creation of a nitrogen flow, the mixture was agitated at 150 rpm so as to become a homogeneous suspended solution. At this stage, white nylon salt slurry was obtained. Next, the autoclave was hermetically sealed, and the agitation speed was set to 100 rpm. Then, the internal temperature was elevated to 150° C. The solution was kept at 150° C. for 60 minutes, then allowed to cool to room temperature, and filtered. The resulting white solid was extracted from 100.0 g of N-methyl-2-pyrrolidone (produced by Mitsubishi Chemical Corporation). This extract was concentrated with a rotary evaporator RE-301 (produced by Yamato Scientific Co., Ltd.) until the amount of the solution became approximately 20 g. The deposited solid was filtered off. The filtrate obtained by the filtration was further concentrated with a rotary evaporator until the amount of the solution became approximately 10 g. The deposited solid was filtered off again. 20 g of methanol (produced by Mitsubishi Gas Chemical Co., Inc.) was added to a solid obtained by the drying of the resulting filtrate, and the mixture was agitated, then filtered and dried at 150° C. for 5 hours, thereby providing 1.6 g of a white solid.

The IR measurement of the resulting white solid showed the characteristic absorption of an imide ring observed at 1701 cm$^{-1}$ and 1770 cm$^{-1}$.

In the FD-MS measurement, a peak mostly corresponding to a molecular weight of 648.2 was observed (see FIG. 1), confirming that the cyclic oligoimide of interest was isolated.

As a result of measuring the 1% decomposition temperature by TG-DTA in the air atmosphere, a value as high as 359° C. was obtained.

The cyclic oligoimide is capable of improving heat resistance by mixing with various resins and as such, may be used as one of the materials for resin compositions that require high-temperature characteristics, such as members for automobiles, industrial mechanical members, and members for electric and electronic parts.

INDUSTRIAL APPLICABILITY

In the present invention, a polyimide resin contains particular plural kinds of polyimide structural units at a particular ratio, and thus has, for example, a low melting point of 360° C. or less and a high glass transition temperature of 170° C. or more (preferably 200° C. or more). The polyimide resin having such a peculiar capability is capable of providing a polyimide resin composition that is capable of being easily processed by molding and prepared into a molded article excellent in heat resistance. Various additives may be added to the polyimide resin composition, thereby imparting a desired capability, for example, mechanical strength, flame resistance, design properties, slidability, heat aging resistance, and conductivity.

In the present invention, use of the particular polyimide resin facilitates preparing a composite with a fiber material, compared with use of conventional general polyimide resins, and is capable of imparting recyclability and molding processability to a composite material. The composite material of the present invention is far superior in heat resistance and mechanical strength to a composite material using a thermoplastic resin, such as a polyolefin resin or a polyamide resin.

The invention claimed is:

1. A polyimide resin composition, comprising:
   a polyimide resin, and
   an additive,
   wherein the polyimide resin comprises a repeating structural unit represented by formula (1) and a repeating structural unit represented by formula (2),
   a content ratio of the repeating structural unit of formula (1) with respect to a total of the repeating structural unit of formula (1) and the repeating structural unit of formula (2) is from 40 to 70 mol %:

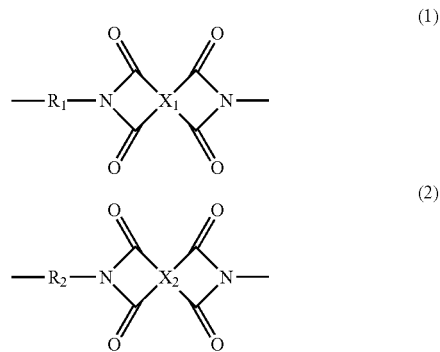

wherein $R_1$ represents a divalent group comprising 6 to 22 carbon atoms comprising an alicyclic hydrocarbon structure;

$R_2$ represents a divalent chain aliphatic group comprising 5 to 12 carbon atoms; and $X_1$ and $X_2$ each independently represents a tetravalent group comprising 6 to 22 carbon atoms comprising an aromatic ring;

the additive is at least one selected from the group consisting of a filler, a flame retardant, a colorant, a slidability-improving agent, and an antioxidant; and the polyimide resin has a melting point of 360° C. or less and a glass transition temperature of 200° C. or more.

2. The polyimide resin composition according to claim 1, wherein $R_1$ represents a divalent group represented by formula (R1-1) or formula (R1-2):

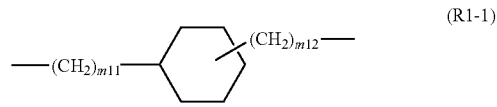

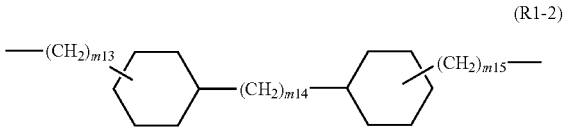

wherein $m_{11}$ and $m_{12}$ each independently represents an integer of from 0-2; and $m_{13}$ to $m_{15}$ each independently represents an integer of from 0-2.

3. The polyimide resin composition according to claim 1, wherein $R_1$ represents a divalent group represented by formula (R1-3):

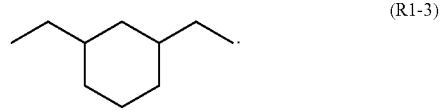

4. The polyimide resin composition according to claim 1, wherein $R_2$ represents an alkylene group comprising 5 to 12 carbon atoms.

5. The polyimide resin composition according to claim 1, wherein $X_1$ and $X_2$ each independently represents a tetravalent group represented by one of formula (X-1), formula (X-2), formula (X-3) or formula (X-4):

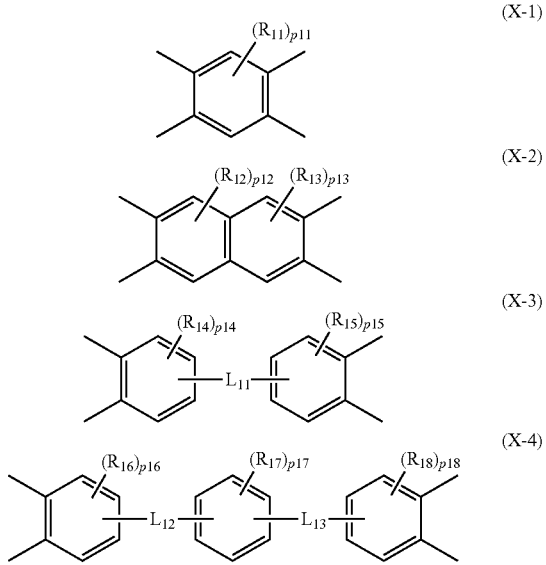

wherein
R$_{11}$ to R$_{18}$ each independently represents an alkyl group comprising 1 to 4 carbon atoms;
p$_{11}$ to p$_{13}$ each independently represents an integer of from 0-2;
p$_{14}$, p$_{15}$, p$_{16}$ and p$_{18}$ each independently represents an integer of from 0-3;
p$_{17}$ represents an integer of from 0-4; and
L$_{11}$ to L$_{13}$ each independently represents a single bond, an ether group, a carbonyl group or an alkylene group comprising 1 to 4 carbon atoms.

6. The polyimide resin composition according to claim 1, wherein the polyimide resin further comprises a repeating structural unit represented by formula (3), and
a content ratio of the repeating structural unit of formula (3) with respect to the total of the repeating structural unit of formula (1) and the repeating structural unit of formula (2) being 25 mol % or less:

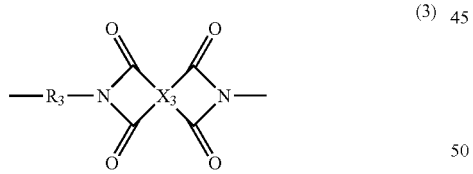

wherein
R$_3$ represents a divalent group comprising 6 to 22 carbon atoms comprising an aromatic ring; and
X$_3$ represents a tetravalent group comprising 6 to 22 carbon atoms comprising an aromatic ring.

7. The polyimide resin composition according to claim 1, wherein the filler is at least one selected from the group consisting of silica, alumina, kaolinite, wollastonite, mica, talc, clay, sericite, magnesium carbonate, magnesium sulfate, glass beads, glass fiber, carbon fiber, alumina fiber, potassium titanate whisker, aluminum borate whisker, magnesium-based whisker, silicon-based whisker, acrylic fiber, poly(benzimidazole) fiber, and wholly aromatic polyimide fiber.

8. The polyimide resin composition according to claim 1, wherein the flame retardant is at least one selected from the group consisting of a halogen-based flame retardant, a phosphorus-based flame retardant, and a metal oxide-based flame retardant.

9. The polyimide resin composition according to claim 1, wherein the colorant is at least one selected from the group consisting of a blue dye, a green dye, graphite, carbon black, titanium dioxide, calcium sulfate, and calcium carbonate.

10. The polyimide resin composition according to claim 1, wherein the slidability-improving agent is at least one selected from the group consisting of molybdenum disulfide, a metallic soap, a mineral oil, a synthetic oil, a wax, a fluorine-based resin, a polyolefin, and a spherical phenol.

11. The polyimide resin composition according to claim 1, wherein the antioxidant is at least one selected from the group consisting of a phenol-based antioxidant, a sulfur-based antioxidant, a phosphorus-based antioxidant, and an amine-based antioxidant.

12. A molded article, comprising the polyimide resin composition according to claim 1.

13. A method for producing a molded article, comprising heat-molding the polyimide resin composition according to claim 1 at a temperature of from 300 to 400° C.

14. A film, comprising the polyimide resin composition according to claim 1.

15. A fiber, comprising the polyimide resin composition according to claim 1.

16. A heat-resistant adhesive, comprising the polyimide resin composition according to claim 1.

17. A color filter, comprising the polyimide resin composition according to claim 1.

18. A solar cell substrate, comprising the polyimide resin composition according to claim 1.

19. A bearing for automobiles, comprising the polyimide resin composition according to claim 1.

20. A bearing for copiers, comprising the polyimide resin composition according to claim 1.

21. A fixing belt or an intermediate transfer belt, comprising the polyimide resin composition according to claim 1.

22. A composite material, comprising:
a fiber material impregnated with a polyimide resin comprising a repeating structural unit represented by formula (1) and a repeating structural unit represented by formula (2),
a content ratio of the repeating structural unit of formula (1) with respect to a total of the repeating structural unit of formula (1) and the repeating structural unit of formula (2) is from 40 to 70 mol %:
wherein

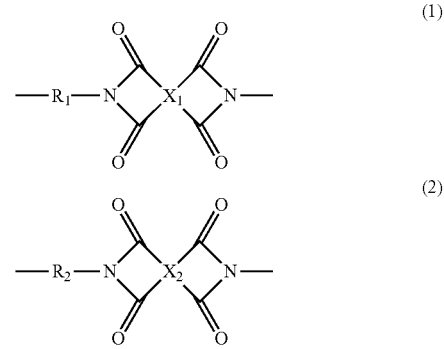

R$_1$ represents a divalent group comprising 6 to 22 carbon atoms comprising an alicyclic hydrocarbon structure;

$R_2$ represents a divalent chain aliphatic group comprising 5 to 20 carbon atoms; and $X_1$ and $X_2$ each independently represents a tetravalent group comprising 6 to 22 carbon atoms comprising an aromatic ring.

23. A molded article, comprising the composite material according to claim 22.

24. A method for producing a molded article, comprising heat-molding the composite material according to claim 22 at a temperature of from 300 to 400° C.

* * * * *